(12) United States Patent
Kalina

(10) Patent No.: US 8,464,532 B2
(45) Date of Patent: Jun. 18, 2013

(54) POWER SYSTEMS AND METHODS FOR HIGH OR MEDIUM INITIAL TEMPERATURE HEAT SOURCES IN MEDIUM AND SMALL SCALE POWER PLANTS

(75) Inventor: Alexander I. Kalina, Hillsborough, CA (US)

(73) Assignee: Kalex, LLC, Belmont, CA (US)

( * ) Notice: Subject to any disclaimer, the term of this patent is extended or adjusted under 35 U.S.C. 154(b) by 754 days.

(21) Appl. No.: 12/630,705

(22) Filed: Dec. 3, 2009

(65) Prior Publication Data

US 2010/0146973 A1   Jun. 17, 2010

Related U.S. Application Data

(63) Continuation-in-part of application No. 12/259,094, filed on Oct. 27, 2008, now Pat. No. 7,980,079.

(51) Int. Cl.
*F01K 25/08* (2006.01)
*F01K 25/06* (2006.01)
*F01K 25/00* (2006.01)

(52) U.S. Cl.
USPC .................... 60/649; 60/651; 60/671; 60/673

(58) Field of Classification Search
USPC .............................. 60/653, 649, 651, 673, 671
See application file for complete search history.

(56) References Cited

U.S. PATENT DOCUMENTS

| | | | | | |
|---|---|---|---|---|---|
| 4,164,849 | A * | 8/1979 | Mangus | ............................ | 60/679 |
| 5,649,426 | A * | 7/1997 | Kalina et al. | ...................... | 60/649 |
| 7,055,326 | B1 * | 6/2006 | Kalina | .............................. | 60/649 |
| 7,096,665 | B2 * | 8/2006 | Stinger et al. | .................... | 60/651 |
| 7,278,264 | B2 * | 10/2007 | Brostow | .......................... | 60/651 |
| 7,287,381 | B1 * | 10/2007 | Pierson et al. | .................... | 60/651 |
| 7,305,829 | B2 * | 12/2007 | Mirolli et al. | .................... | 60/649 |
| 7,980,079 | B2 * | 7/2011 | Kalina | .............................. | 60/649 |
| 2006/0096289 | A1 * | 5/2006 | Kalina | .............................. | 60/649 |

FOREIGN PATENT DOCUMENTS

SU   802737 B  *  2/1981
SU   941810 B  *  7/1982

* cited by examiner

*Primary Examiner* — Kenneth Bomberg
*Assistant Examiner* — Deming Wan
(74) *Attorney, Agent, or Firm* — Robert W Strozier

(57) ABSTRACT

Power generation systems and methods are disclosed for use with medium to high temperature heat source stream, gaseous or liquid, where the systems and methods permit efficient energy extraction for medium and small scale power plants.

15 Claims, 10 Drawing Sheets

POWER SYSTEMS AND METHODS FOR HIGH OR MEDIUM INITIAL TEMPERATURE HEAT SOURCES IN MEDIUM AND SMALL SCALE POWER PLANTS

RELATED APPLICATIONS

This application is a Continuation-in-Part of U.S. patent application Ser. No. 12/259,094, filed 27 Oct. 2008 (Oct. 27, 2008).

BACKGROUND OF THE INVENTION

1. Field of the Invention

The present invention relates to power systems and methods designed for the utilization of heat sources with high or medium initial temperatures (from 1076° F. to 400° F.) in medium and small scale power plants.

More particularly, the present invention relates to power systems and methods designed for the utilization of heat sources with high or medium initial temperatures (from 1076° F. to 400° F.) in medium and small scale power plants, where the systems include complete at least one turbine, six heat exchange apparatus, a heat recovery vapor generator, at least three working fluid pumps, a separator and optionally an admission valve along with a plurality of mixing and dividing valves. The method includes converting a portion of heat in at least one vaporized, superheated working fluid stream, using a spent stream to heat a rich or basic working fluid stream and lean working fluid stream, combining the cooled superheated stream with a portion of the lean stream and using the combined stream to preheat the rich working fluid stream and the lean working fluid stream and separating a resulting partially condensed combined stream into a vapor stream and a lean working fluid liquid stream, forming the basic working fluid stream from the vapor stream and a portion of the lean working fluid liquid stream, where the cycle is closed and an external coolant stream is used to condense the basic working fluid stream and an external heat source stream is used to fully vaporize and superheat the at least one working fluid stream prior to the converting step.

2. Description of the Related Art

In U.S. Pat. Nos. 5,095,708, and 5,572,871, power systems were presented that were designed to serve as bottoming cycles for combined cycle systems. These systems both had a specific feature which was the key to their high efficiency; both systems used intercooling of the working fluid in between turbine stages. Because the heat released during intercooling was recuperated, it was then used as an additional source of heating for the process of vaporization. This resulted in a drastic increase in the thermodynamical reversibility and correspondingly in higher efficiency of the power cycle.

However, in the prior art, this process of intercooling was performed in a special heat exchanger, a so-called "intercooler." Such an intercooler requires that the streams of working fluid in both the tubes and the shell of the intercooler be at high pressure. Moreover, the intercooled stream in the prior art is in the form of a vapor, and therefore the heat transfer coefficient from the vapor to the intercooler tubes is low. As a result, such an intercooler must be a very large and very expensive high pressure heat exchanger. This in turn has a very negative impact on the economics of the entire system.

Thus, there is a need in the art for a system designed to utilize high to medium temperatures sources in small to medium power plants to convert a potion of the thermal energy from these heat sources into electrical power.

SUMMARY OF THE INVENTION

The present invention provides a system for extracting electrical power from high to medium temperature heat source streams, where the system includes at least on energy conversion apparatus or turbine (T1), six heat exchange apparatuses, at least three pumps, a heat recovery vapor generator (HRVG), and a separator (S1), where at least five different compositional multicomponent streams are circulated through a closed cycle to permit cost effective power extraction from the high to medium temperature heat source streams in medium to small scale power plants, where energy can be extracted from a single combinational stream or from a combinational stream and a lean stream both fully vaporized and superheated by the HRVG after being heated by five of the heat exchanger apparatuses while the sixth heat exchange apparatus is a condenser, which fully condenses a starting basic working fluid stream.

The present invention provides a method for extracting electrical energy from a medium to high temperature heat source stream (gas or liquid), the where method includes converting a portion of heat in at least one vaporized, superheated working fluid stream in a turbine to form a spent stream. The method also includes using the spent stream to heat a rich or basic working fluid stream and a first lean working fluid substream, combining the cooled spent stream with a second lean working fluid substream and using the combined stream to preheat the rich working fluid stream and the first lean working fluid substream. The method also includes separating a resulting partially condensed combined stream into a vapor stream and a lean working fluid liquid stream. The method also includes dividing the lean working fluid liquid stream into the first lean working fluid substream, the second lean working fluid substream and a third lean working fluid substream. The method also includes forming the basic working fluid stream from the vapor stream and the third the lean working fluid liquid substream, where the cycle is closed and an external coolant stream is used to condense the basic working fluid stream and an external heat source stream is used to supply the heat for the cycle and to fully vaporize and superheat the at least one working fluid stream prior to the converting step.

BRIEF DESCRIPTION OF THE DRAWINGS

The invention can be better understood with reference to the following detailed description together with the appended illustrative drawings in which like elements are numbered the same:

FIG. 3 depicts another embodiment of a system of this invention including a single superheated stream and a single turbine subsystem designated CSQ-21a.

DETAILED DESCRIPTION OF THE INVENTION

Figure 1A:
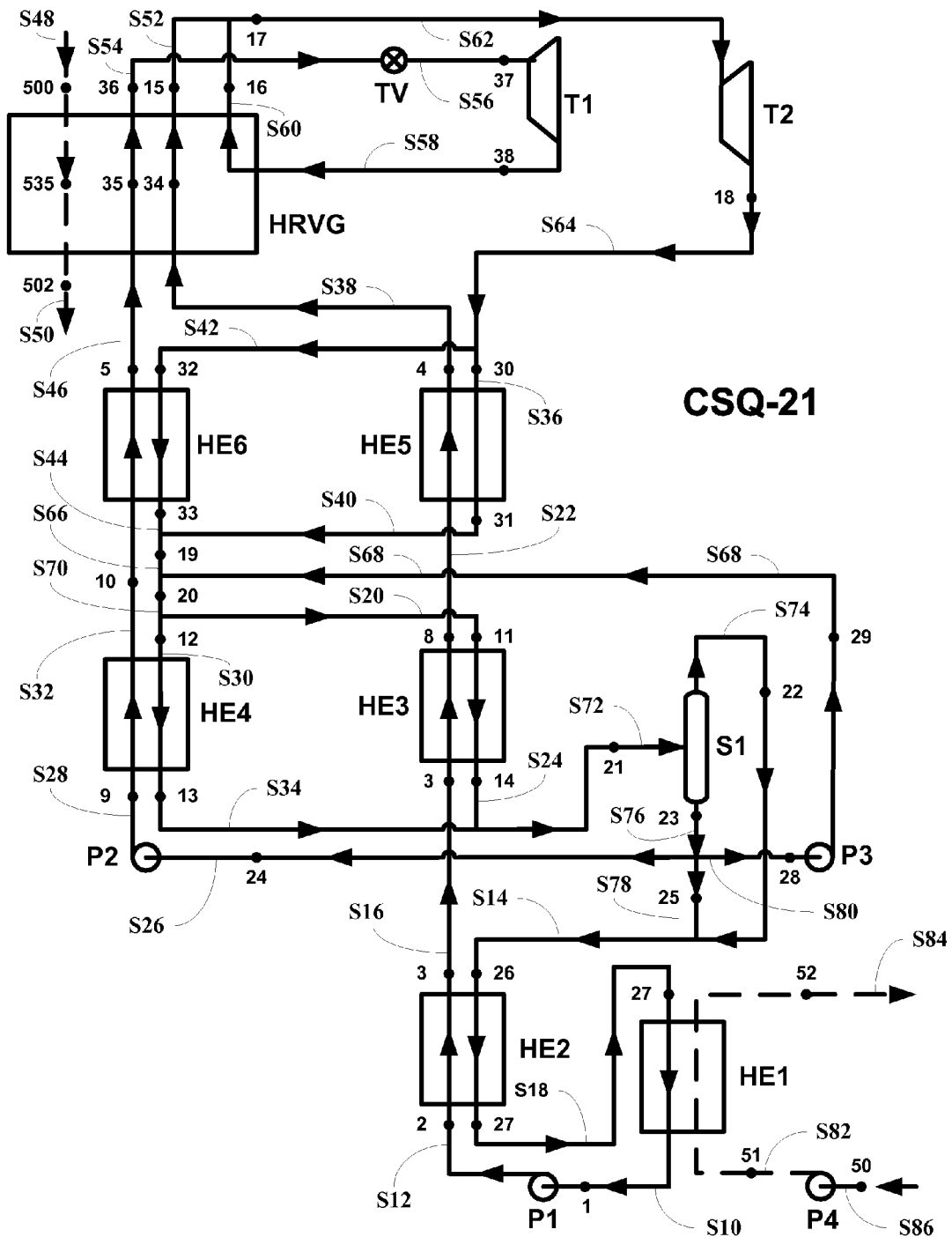
FIG. 1A depicts an embodiment of a system of this invention including dual superheated streams, a lean stream and a rich stream and a dual turbine subsystem, one turbine for a lean stream and one turbine for a rich stream designated CSQ-21.

The present invention broadly relates to a system for high or medium initial temperature heat sources in medium and small scale power plants comprising a turbine subsystem including at least one turbine adapted to convert a portion of thermal energy contained in at least one vaporized, superheated stream to form a spent stream. The system also includes a heat recovery vapor generator adapted to fully vaporize and superheat at least one heated stream to form the at least one vaporized, superheated stream. The system also includes a first heat exchange apparatus adapted to heat a partially heated rich working fluid stream and a preheated first lean working fluid substream with heat from the spent stream to form a heated rich working fluid stream and a heated lean working fluid stream and a cooled spent stream. The system also includes a first combining valve adapted to combine the cooled spent stream with a higher pressure second lean working fluid stream to form a leaner spent stream. The system also includes a second heat exchange apparatus adapted to heat a preheated rich working fluid stream and a high pressure first lean working fluid substream with heat from the leaner spent stream to form the partially heated rich working fluid stream and the preheated first lean working fluid substream and a partially condensed leaner spent stream. The system also includes a separator adapted to separate the partially condensed leaner spent stream into a vapor stream and a lean liquid working fluid stream. The system also includes a first dividing valve adapted to divide the lean liquid working fluid stream into a first lean liquid working fluid substream, a second lean liquid working fluid substream, and a third lean liquid working fluid substream. The system also includes a first pump (P2) adapted to raise a pressure of the first lean liquid working fluid substream to a high pressure to form the high pressure first lean working fluid stream. The system also includes a second pump (P3) adapted to raise a pressure of the second lean liquid working fluid substream to a higher pressure to form the higher pressure second lean working fluid stream. The system also includes a second combining valve adapted to combine the vapor stream and the third lean liquid working fluid substream to form a basic working fluid stream. The system also includes a third heat exchange apparatus to heat an intermediate pressure basic working fluid stream to form the preheated basic working fluid stream and a cooled basic working fluid stream. The system also includes a fourth heat exchange apparatus adapted to condense the cooled basic working fluid stream with an external coolant stream to form a fully condensed basic working fluid stream. The system also includes a third pump (P1) adapted to raise a pressure of the fully condensed basic working fluid stream to form the intermediate pressure basic working fluid stream.

A system for heat conversion comprising (a) a turbine subsystem (TSS) including at least one turbine adapted to convert a portion of thermal energy contained in a fully vaporized and superheated rich working fluid stream to form a spent rich working fluid stream, (b) a vaporizing and superheating subsystem (VSS) including a heat recovery vapor generator (HRVG) and at least one VSS heat exchange unit, where the HRVG is adapted to produce the fully vaporized and superheated rich working fluid stream using heat from an external heat source stream and the at least one VSS heat exchange unit is adapted to produce a heated richer working fluid stream and a heated lean or leaner working fluid stream using heat from the spent rich working fluid stream, (c) a heat exchange and separation subsystem (HESS) including at least one HESS heat exchange unit, a separator and at least two HESS pumps, where the at least one HESS heat exchange unit is adapted to form a heated richer working fluid stream and a pre-heated higher pressure first leaner working fluid substream with heat from a condensing working fluid stream comprising a cooled spent working fluid stream and a higher pressure second leaner working fluid substream, where the separator is adapted to separate a cooled condensing working fluid stream into a rich vapor stream and a liquid leaner working fluid stream, where the liquid leaner working fluid stream is split into a first leaner working fluid substream, second leaner working fluid substream and third leaner working fluid substream and where the two HESS pumps are adapted to produce a higher pressure first leaner working fluid substream and the higher pressure second leaner working fluid stream, and (d) a condensing subsystem (CSS) including two CSS heat exchange units and a CSS pump, where the CSS pump is adapted to produce a higher pressure fully condensed richer working fluid stream form a fully condensed richer working fluid stream, where one of the CSS heat exchange units is adapted to pre-heat the higher pressure fully condensed richer working fluid stream and partially condense a richer working fluid stream comprising the third leaner working fluid substream and the rich vapor stream, and where the other CSS heat exchange unit is adapted to fully condense the partially condensed richer working fluid stream using an external coolant stream to form the fully condensed richer working fluid stream, and where all of the streams are derived from a single multi-component fluid including at least one lower boiling point component and at least one higher boiling point component, where the rich vapor stream has a first fluid composition, where the richer working fluid streams having a second fluid composition, where the rich working fluid streams have a third fluid composition, where the condensing working fluid streams have a fourth fluid composition and where the leaner working fluid streams have a fifth fluid composition.

The first fluid composition has a higher concentration of the at least one lower boiling point component than the second fluid composition, which has a higher concentration of the at least one lower boiling point component than the third fluid composition and where the fifth composition has a higher concentration of the higher boiling point component than the fourth composition and where the third and fourth compositions are the same or the third composition has a higher concentration of the lower boiling point component than the fourth composition.

The heated richer working fluid stream and the heated leaner working fluid stream are combined into a rich working fluid stream, prior to the rich working fluid stream entering the HRVG and exiting the HRVG as the at least one fully vaporized and superheated rich working fluid stream.

The heated richer stream and the heated leaner stream are superheated in the HRVG and then combined into the at least one fully vaporized and superheated rich stream.

The TSS comprises a higher pressure turbine having a admission valve and a lower pressure turbine, where the higher pressure turbine is adapted to convert a portion of heat in a fully vaporized, superheated leaner working fluid stream to form a spent leaner working fluid stream, where the lower pressure turbine is adapted to convert a portion of heat in a fully vaporized, superheated rich working fluid stream comprising a fully vaporized and superheated richer working fluid stream and the spent leaner working fluid stream and where the heated richer working fluid stream and the heated leaner working fluid stream are simultaneously vaporized and superheated in the HRVG and the spent leaner working fluid stream is simultaneously reheated in an upper part of the HRVG and where the VSS further includes two VSS heat exchange units, one of the VSS heat exchange units is adapted to heat the pre-heated first leaner working fluid substream and the other VSS heat exchange unit is adapted to heat and vaporize the heated richer working fluid stream with heat from two spent rich working fluid substream formed from the spent rich working fluid substream and where the HESS includes two HESS heat exchange units, one of the HESS heat exchange units is adapted to pre-heat the higher pressure, first leaner working fluid substream with heat from a first condensing working fluid substream and the other HESS heat exchange unit is adapted to heat the pre-heated richer working fluid stream and where the two cooled condensing working fluid substreams are combined into the cooled condensing working fluid stream.

The TSS comprises a higher pressure turbine having a admission valve and a lower pressure turbine, where the higher pressure turbine is adapted to convert a portion of heat in a fully vaporized, superheated leaner working fluid stream to form a spent leaner working fluid stream, where the lower pressure turbine is adapted to convert a portion of heat in a fully vaporized, superheated rich working fluid stream comprising a fully vaporized and superheated richer working fluid stream and the spent leaner working fluid stream and where the heated richer working fluid stream and the heated leaner working fluid stream are simultaneously vaporized and superheated in the HRVG and the spent leaner working fluid stream is simultaneously reheated in an upper part of the HRVG and where the at least one VSS heat exchange unit comprises a dual flow heat exchange unit, where the pre-heated leaner working fluid substream and the heated richer working fluid stream are simultaneously heated by the spent rich working fluid stream and where the HESS includes two HESS heat exchange units, one of the HESS heat exchange units is adapted to pre-heat the higher pressure, first leaner working fluid substream with heat from a first condensing working fluid substream and the other HESS heat exchange unit is adapted to heat the pre-heated richer working fluid stream and where the two cooled condensing working fluid substreams are combined into the cooled condensing working fluid stream.

The TSS comprises a higher pressure turbine having a admission valve and a lower pressure turbine, where the higher pressure turbine is adapted to convert a portion of heat in a fully vaporized, superheated leaner working fluid stream to form a spent leaner working fluid stream, where the lower pressure turbine is adapted to convert a portion of heat in a fully vaporized, superheated rich working fluid stream comprising a fully vaporized and superheated richer working fluid stream and the spent leaner working fluid stream and where the heated richer working fluid stream and the heated leaner working fluid stream are simultaneously vaporized and superheated in the HRVG and the spent leaner working fluid stream is simultaneously reheated in an upper part of the HRVG and where the VSS further includes two VSS heat exchange units, one of the VSS heat exchange units is adapted to heat the pre-heated first leaner working fluid substream and the other VSS heat exchange unit is adapted to heat and vaporize the heated richer working fluid stream with heat from two spent rich working fluid substream formed from the spent rich working fluid substream and where the at least one HESS heat exchange unit comprises a dual flow heat exchange unit, where the higher pressure, first leaner working fluid substream and the pre-heated richer working fluid stream are simultaneously heated by the condensing working fluid stream.

The TSS comprises a higher pressure turbine having a admission valve and a lower pressure turbine, where the higher pressure turbine is adapted to convert a portion of heat in a fully vaporized, superheated leaner working fluid stream to form a spent leaner working fluid stream, where the lower pressure turbine is adapted to convert a portion of heat in a fully vaporized, superheated rich working fluid stream comprising a fully vaporized and superheated richer working fluid stream and the spent leaner working fluid stream and where the heated richer working fluid stream and the heated leaner working fluid stream are simultaneously vaporized and superheated in the HRVG and the spent leaner working fluid stream is simultaneously reheated in an upper part of the HRVG and where the at least one VSS heat exchange unit comprises a VSS dual flow heat exchange unit, where the pre-heated leaner working fluid substream and the heated richer working fluid stream are simultaneously heated by the spent rich working fluid stream and where the at least one HESS heat exchange unit comprises a HESS dual flow heat exchange unit, where the higher pressure, first leaner working fluid substream and the pre-heated richer working fluid stream are simultaneously heated by the condensing working fluid stream.

The TSS comprises a higher pressure turbine having a admission valve and a lower pressure turbine, where the higher pressure turbine is adapted to convert a portion of heat in a fully vaporized, superheated lean working fluid stream to form a spent lean working fluid stream, where the lower pressure turbine is adapted to convert a portion of heat in a fully vaporized, superheated rich working fluid stream. The VSS further includes three VSS heat exchange units, one of the VSS heat exchange units is adapted to heat the higher pressure, lean working fluid stream with heat from a first spent rich working fluid substream, another of the VSS heat exchange units is adapted to heat and vaporize a further heated, second richer working fluid substream with heat from a second spent rich working fluid substream, where the spent rich working fluid substreams are formed from the spent rich working fluid substream and where the third VSS heat exchange unit is adapted to further heat the heated, second richer working fluid substream with heat from a combined cooled spent rich working fluid stream and where a heated higher pressure, lean working fluid stream is fully vaporized and superheated in the HRVG and a fully vaporized rich working fluid stream is simultaneously superheated in an upper part of the HRVG, where the fully vaporized rich working fluid stream comprises a fully vaporized second richer working fluid substream and the spent lean working fluid stream to form the fully vaporized, superheated lean working fluid stream and the fully vaporized, superheated rich working fluid stream. The HESS includes two HESS heat exchange units and a third pump, where one of the HESS heat exchange units is adapted to pre-heat the higher pressure, first leaner working fluid substream with heat from a first condensing working fluid substream and the other HESS heat exchange unit is adapted to heat the pre-heated richer working fluid stream and where the two cooled condensing working fluid substreams are combined into the cooled condensing working fluid stream, and where the heated richer working fluid stream is split into a first heated richer working fluid substream and a second heated richer working fluid substream and where the pre-heated, first leaner working fluid substream is combined with the first heated richer working fluid substream to form a lean working fluid stream, and where the third pump is adapted to produce the higher pressure, lean working fluid stream.

The TSS comprises a higher pressure turbine having a admission valve and a lower pressure turbine, where the higher pressure turbine is adapted to convert a portion of heat in a fully vaporized, superheated lean working fluid stream to form a spent lean working fluid stream, where the lower pressure turbine is adapted to convert a portion of heat in a fully vaporized, superheated rich working fluid stream. The at least one VSS heat exchange unit comprises a dual flow heat exchange unit, where the higher pressure, lean working fluid stream and the further heated richer working fluid stream are simultaneously heated with heat from the spent rich working fluid stream and where a heated higher pressure, lean working fluid stream is fully vaporized and superheated in the HRVG and a fully vaporized rich working fluid stream is simultaneously superheated in an upper part of the HRVG, where the fully vaporized rich working fluid stream comprises a fully vaporized second richer working fluid substream and the spent lean working fluid stream to form the fully vaporized, superheated lean working fluid stream and the fully vaporized, superheated rich working fluid stream. The HESS includes two HESS heat exchange units and a third pump, where one of the HESS heat exchange units is adapted to pre-heat the higher pressure, first leaner working fluid substream with heat from a first condensing working fluid substream and the other HESS heat exchange unit is adapted to heat the pre-heated richer working fluid stream and where the two cooled condensing working fluid substreams are combined into the cooled condensing working fluid stream, and where the heated richer working fluid stream is split into a first heated richer working fluid substream and a second heated richer working fluid substream and where the pre-heated, first leaner working fluid substream is combined with the first heated richer working fluid substream to form a lean working fluid stream, and where the third pump is adapted to produce the higher pressure, lean working fluid stream.

The TSS comprises a higher pressure turbine having a admission valve and a lower pressure turbine, where the higher pressure turbine is adapted to convert a portion of heat in a fully vaporized, superheated lean working fluid stream to form a spent lean working fluid stream, where the lower pressure turbine is adapted to convert a portion of heat in a fully vaporized, superheated rich working fluid stream. The VSS further includes three VSS heat exchange units, one of the VSS heat exchange units is adapted to heat the higher pressure, lean working fluid stream with heat from a first spent rich working fluid substream, another of the VSS heat exchange units is adapted to heat and vaporize a further heated, second richer working fluid substream with heat from a second spent rich working fluid substream, where the spent rich working fluid substreams are formed from the spent rich working fluid substream and where the third VSS heat exchange unit is adapted to further heat the heated, second richer working fluid substream with heat from a combined cooled spent rich working fluid stream and where a heated higher pressure, lean working fluid stream is fully vaporized and superheated in the HRVG and a fully vaporized rich working fluid stream is simultaneously superheated in an upper part of the HRVG, where the fully vaporized rich working fluid stream comprises a fully vaporized second richer working fluid substream and the spent lean working fluid stream to form the fully vaporized, superheated lean working fluid stream and the fully vaporized, superheated rich working fluid stream. The HESS includes a third pump and the at least one HESS heat exchange unit comprises a dual flow heat exchange unit, where the higher pressure, first leaner working fluid substream and the pre-heated richer working fluid stream are simultaneously heated by the condensing working fluid stream and where the heated richer working fluid stream is split into a first heated richer working fluid substream and a second heated richer working fluid substream and where the pre-heated, first leaner working fluid substream is combined with the first heated richer working fluid substream to form a lean working fluid stream, and where the third pump is adapted to produce the higher pressure, lean working fluid stream.

The TSS comprises a higher pressure turbine having a admission valve and a lower pressure turbine, where the higher pressure turbine is adapted to convert a portion of heat in a fully vaporized, superheated lean working fluid stream to form a spent lean working fluid stream, where the lower pressure turbine is adapted to convert a portion of heat in a fully vaporized, superheated rich working fluid stream. The at least one VSS heat exchange unit comprises a dual flow heat exchange unit, where the higher pressure, lean working fluid stream and the further heated richer working fluid stream are simultaneously heated with heat from the spent rich working fluid stream and where a heated higher pressure, lean working fluid stream is fully vaporized and superheated in the HRVG and a fully vaporized rich working fluid stream is simultaneously superheated in an upper part of the HRVG, where the fully vaporized rich working fluid stream comprises a fully vaporized second richer working fluid substream and the spent lean working fluid stream to form the fully vaporized, superheated lean working fluid stream and the fully vaporized, superheated rich working fluid stream. The HESS includes a third pump and the at least one HESS heat exchange unit comprises a dual flow heat exchange unit, where the higher pressure, first leaner working fluid substream and the pre-heated richer working fluid stream are simultaneously heated by the condensing working fluid stream and where the heated richer working fluid stream is split into a first heated richer working fluid substream and a second heated richer working fluid substream and where the pre-heated, first leaner working fluid substream is combined with the first heated richer working fluid substream to form a lean working fluid stream, and where the third pump is adapted to produce the higher pressure, lean working fluid stream.

The present invention broadly relates to a method for high or medium initial temperature heat sources in medium and small scale power plants comprising the step of converting a portion of heat from at least one vaporized, superheated stream to electrical power to form a spent stream. The method also includes the step of fully vaporizing and superheating at least one heated stream in a heat recovery vapor generator to form the at least one vaporized, superheated stream. The method also includes the step of heating, in a first heat exchange apparatus, a partially heated rich working fluid stream and a preheated first lean working fluid substream with heat from the spent stream to form a heated rich working fluid stream and a heated lean working fluid stream and a cooled spent stream. The method also includes the step of combining, in a first combining valve, the cooled spent stream with a higher pressure second lean working fluid stream to form a leaner spent stream. The method also includes the step of heating, in a second heat exchange apparatus, a preheated rich working fluid stream and a high pressure first lean working fluid substream with heat from the leaner spent stream to form the partially heated rich working fluid stream and the preheated first lean working fluid substream and a partially condensed leaner spent stream. The method also includes the step of separating, in a separator, the partially condensed leaner spent stream into a vapor stream and a lean liquid working fluid stream. The method also includes the step of dividing, in a first dividing valve, the lean liquid working fluid stream into a first lean liquid working fluid substream, a second lean liquid working fluid substream, and a third lean liquid working fluid substream. The method also includes the step of raising, in a first pump (P2), a pressure of the first lean liquid working fluid substream to a high pressure to form the high pressure first lean working fluid stream. The method also includes the step of raising, in a second pump (P3), a pressure of the second lean liquid working fluid substream to a higher pressure to form the higher pressure second lean working fluid stream. The method also includes the step of combining, in a second combining valve, the vapor stream and the third lean liquid working fluid substream to form a basic working fluid stream. The method also includes the step of heating, in a third heat exchange apparatus, an intermediate pressure basic working fluid stream to form the preheated basic working fluid stream and a cooled basic working fluid stream. The method also includes the step of condensing, in a fourth heat exchange apparatus, the cooled basic working fluid stream with an external coolant stream to form a fully condensed basic working fluid stream. The method also includes the step of raising, in a third pump (P1), a pressure of the fully condensed basic working fluid stream to form the intermediate pressure basic working fluid stream.

A method for heat conversion comprising the steps of converting a portion of heat in at least one fully vaporized, superheated rich working fluid stream into a useable form of energy in a turbine subsystem (TSS) to form a spent rich working fluid stream, heating a richer working fluid stream and a lean or leaner working fluid stream with heat from the spent rich working fluid stream in a vaporizing and superheating subsystem (VSS) including a heat recovery vapor generator (HRVG) and at least one VSS heat exchange unit, and fully vaporizing and superheating the rich working fluid stream comprising the heated richer working fluid stream and the heated lean or leaner working fluid stream with from heat derived from an external heat source stream in the HRVG to form the fully vaporized, superheated rich working fluid stream. The method also comprises the steps of heating a higher pressure second leaner working fluid substream and a pre-heated, higher pressure richer working fluid stream with heat from a condensing working fluid stream in a heat exchange and separation subsystem (HESS) including at least one HESS heat exchange unit, a separator and at least two HESS pumps, separating a cooled condensing working fluid stream in the separator into a rich vapor stream and a liquid leaner working fluid stream, and splitting the liquid leaner working fluid stream into first, second and third leaner working fluid substreams. The method also comprises the steps of pressurizing the first leaner working fluid substream to form a higher pressure first leaner working fluid stream, pressurizing the second leaner working fluid stream to form the higher pressure second leaner working fluid stream, combining a cooled spent rich working fluid stream and the higher pressure, second leaner working fluid substream to form the condensing working fluid, and pre-heating a higher pressure fully condensed richer working fluid stream with heat from a richer working fluid stream comprising the third leaner working fluid substream and the rich vapor stream to form a pre-heated richer working fluid stream and a partially condensed richer working fluid stream in a condensing subsystem (CSS) including two CSS heat exchange units and a CSS pump. The method also comprises the steps of condensing the partially condensed richer working fluid stream using an external coolant stream to form a fully condensed richer working fluid stream, and pressurizing the fully condensed richer working fluid stream to form the higher pressure fully condensed richer working fluid stream. All of the streams are derived from a single multi-component fluid including at least one lower boiling point component and at least one higher boiling point component, where the rich vapor stream has a first fluid composition, where the richer working fluid streams having a second fluid composition, where the rich working fluid streams have a third fluid composition, where the condensing streams have a fourth fluid composition, where the leaner working fluid streams have a fifth fluid composition and where the lean working fluid streams have a sixth composition.

The first fluid composition has a higher concentration of the at least one lower boiling point component than the second fluid composition, which has a higher concentration of the at least one lower boiling point component than the third fluid composition and where the fifth composition has a higher concentration of the higher boiling point component than the fourth composition and where the third and fourth compositions are the same or the third composition has a higher concentration of the lower boiling point component than the fourth composition.

The heated richer working fluid stream and the heated leaner working fluid stream are combined into a rich working fluid stream, prior to the rich working fluid stream entering the HRVG and exiting the HRVG as the at least one fully vaporized and superheated rich working fluid stream.

The heated richer stream and the heated leaner stream are superheated in the HRVG and then combined into the at least one fully vaporized and superheated rich stream.

The TSS comprises a higher pressure turbine having a admission valve and a lower pressure turbine, where the higher pressure turbine is adapted to convert a portion of heat in a fully vaporized, superheated leaner working fluid stream to form a spent leaner working fluid stream, where the lower pressure turbine is adapted to convert a portion of heat in a fully vaporized, superheated rich working fluid stream comprising a fully vaporized and superheated richer working fluid stream and the spent leaner working fluid stream and where the heated richer working fluid stream and the heated leaner working fluid stream are simultaneously vaporized and superheated in the HRVG and the spent leaner working fluid stream is simultaneously reheated in an upper part of the HRVG and where the VSS further includes two VSS heat exchange units, one of the VSS heat exchange units is adapted to heat the pre-heated first leaner working fluid substream and the other VSS heat exchange unit is adapted to heat and vaporize the heated richer working fluid stream with heat from two spent rich working fluid substream formed from the spent rich working fluid substream and where the HESS includes two HESS heat exchange units, one of the HESS heat exchange units is adapted to pre-heat the higher pressure, first leaner working fluid substream with heat from a first condensing working fluid substream and the other HESS heat exchange unit is adapted to heat the pre-heated richer working fluid stream and where the two cooled condensing working fluid substreams are combined into the cooled condensing working fluid stream.

The TSS comprises a higher pressure turbine having a admission valve and a lower pressure turbine, where the higher pressure turbine is adapted to convert a portion of heat in a fully vaporized, superheated leaner working fluid stream to form a spent leaner working fluid stream, where the lower pressure turbine is adapted to convert a portion of heat in a fully vaporized, superheated rich working fluid stream comprising a fully vaporized and superheated richer working fluid stream and the spent leaner working fluid stream and where the heated richer working fluid stream and the heated leaner working fluid stream are simultaneously vaporized and superheated in the HRVG and the spent leaner working fluid stream is simultaneously reheated in an upper part of the HRVG and where the at least one VSS heat exchange unit comprises a dual flow heat exchange unit, where the pre-heated leaner working fluid substream and the heated richer working fluid stream are simultaneously heated by the spent rich working fluid stream and where the HESS includes two HESS heat exchange units, one of the HESS heat exchange units is adapted to pre-heat the higher pressure, first leaner working fluid substream with heat from a first condensing working fluid substream and the other HESS heat exchange unit is adapted to heat the pre-heated richer working fluid stream and where the two cooled condensing working fluid substreams are combined into the cooled condensing working fluid stream.

The TSS comprises a higher pressure turbine having a admission valve and a lower pressure turbine, where the higher pressure turbine is adapted to convert a portion of heat in a fully vaporized, superheated leaner working fluid stream to form a spent leaner working fluid stream, where the lower pressure turbine is adapted to convert a portion of heat in a fully vaporized, superheated rich working fluid stream comprising a fully vaporized and superheated richer working fluid stream and the spent leaner working fluid stream and where the heated richer working fluid stream and the heated leaner working fluid stream are simultaneously vaporized and superheated in the HRVG and the spent leaner working fluid stream is simultaneously reheated in an upper part of the HRVG and where the VSS further includes two VSS heat exchange units, one of the VSS heat exchange units is adapted to heat the pre-heated first leaner working fluid substream and the other VSS heat exchange unit is adapted to heat and vaporize the heated richer working fluid stream with heat from two spent rich working fluid substream formed from the spent rich working fluid substream and where the at least one HESS heat exchange unit comprises a dual flow heat exchange unit, where the higher pressure, first leaner working fluid substream and the pre-heated richer working fluid stream are simultaneously heated by the condensing working fluid stream.

The TSS comprises a higher pressure turbine having a admission valve and a lower pressure turbine, where the higher pressure turbine is adapted to convert a portion of heat in a fully vaporized, superheated leaner working fluid stream to form a spent leaner working fluid stream, where the lower pressure turbine is adapted to convert a portion of heat in a fully vaporized, superheated rich working fluid stream comprising a fully vaporized and superheated richer working fluid stream and the spent leaner working fluid stream and where the heated richer working fluid stream and the heated leaner working fluid stream are simultaneously vaporized and superheated in the HRVG and the spent leaner working fluid stream is simultaneously reheated in an upper part of the HRVG and where the at least one VSS heat exchange unit comprises a VSS dual flow heat exchange unit, where the pre-heated leaner working fluid substream and the heated richer working fluid stream are simultaneously heated by the spent rich working fluid stream and where the at least one HESS heat exchange unit comprises a HESS dual flow heat exchange unit, where the higher pressure, first leaner working fluid substream and the pre-heated richer working fluid stream are simultaneously heated by the condensing working fluid stream.

The TSS comprises a higher pressure turbine having a admission valve and a lower pressure turbine, where the higher pressure turbine is adapted to convert a portion of heat in a fully vaporized, superheated lean working fluid stream to form a spent lean working fluid stream, where the lower pressure turbine is adapted to convert a portion of heat in a fully vaporized, superheated rich working fluid stream. The VSS further includes three VSS heat exchange units, one of the VSS heat exchange units is adapted to heat the higher pressure, lean working fluid stream with heat from a first spent rich working fluid substream, another of the VSS heat exchange units is adapted to heat and vaporize a further heated, second richer working fluid substream with heat from a second spent rich working fluid substream, where the spent rich working fluid substreams are formed from the spent rich working fluid substream and where the third VSS heat exchange unit is adapted to further heat the heated, second richer working fluid substream with heat from a combined cooled spent rich working fluid stream and where a heated higher pressure, lean working fluid stream is fully vaporized and superheated in the HRVG and a fully vaporized rich working fluid stream is simultaneously superheated in an upper part of the HRVG, where the fully vaporized rich working fluid stream comprises a fully vaporized second richer working fluid substream and the spent lean working fluid stream to form the fully vaporized, superheated lean working fluid stream and the fully vaporized, superheated rich working fluid stream. The HESS includes two HESS heat exchange units and a third pump, where one of the HESS heat exchange units is adapted to pre-heat the higher pressure, first leaner working fluid substream with heat from a first condensing working fluid substream and the other HESS heat exchange unit is adapted to heat the pre-heated richer working fluid stream and where the two cooled condensing working fluid substreams are combined into the cooled condensing working fluid stream, and where the heated richer working fluid stream is split into a first heated richer working fluid substream and a second heated richer working fluid substream and where the pre-heated, first leaner working fluid substream is combined with the first heated richer working fluid substream to form a lean working fluid stream, and where the third pump is adapted to produce the higher pressure, lean working fluid stream.

The TSS comprises a higher pressure turbine having a admission valve and a lower pressure turbine, where the higher pressure turbine is adapted to convert a portion of heat in a fully vaporized, superheated lean working fluid stream to form a spent lean working fluid stream, where the lower pressure turbine is adapted to convert a portion of heat in a fully vaporized, superheated rich working fluid stream. The at least one VSS heat exchange unit comprises a dual flow heat exchange unit, where the higher pressure, lean working fluid stream and the further heated richer working fluid stream are simultaneously heated with heat from the spent rich working fluid stream and where a heated higher pressure, lean working fluid stream is fully vaporized and superheated in the HRVG and a fully vaporized rich working fluid stream is simultaneously superheated in an upper part of the HRVG, where the fully vaporized rich working fluid stream comprises a fully vaporized second richer working fluid substream and the spent lean working fluid stream to form the fully vaporized, superheated lean working fluid stream and the fully vaporized, superheated rich working fluid stream. The HESS includes two HESS heat exchange units and a third pump, where one of the HESS heat exchange units is adapted to pre-heat the higher pressure, first leaner working fluid substream with heat from a first condensing working fluid substream and the other HESS heat exchange unit is adapted to heat the pre-heated richer working fluid stream and where the two cooled condensing working fluid substreams are combined into the cooled condensing working fluid stream, and where the heated richer working fluid stream is split into a first heated richer working fluid substream and a second heated richer working fluid substream and where the pre-heated, first leaner working fluid substream is combined with the first heated richer working fluid substream to form a lean working fluid stream, and where the third pump is adapted to produce the higher pressure, lean working fluid stream.

The TSS comprises a higher pressure turbine having a admission valve and a lower pressure turbine, where the higher pressure turbine is adapted to convert a portion of heat in a fully vaporized, superheated lean working fluid stream to form a spent lean working fluid stream, where the lower pressure turbine is adapted to convert a portion of heat in a fully vaporized, superheated rich working fluid stream. The VSS further includes three VSS heat exchange units, one of the VSS heat exchange units is adapted to heat the higher pressure, lean working fluid stream with heat from a first spent rich working fluid substream, another of the VSS heat exchange units is adapted to heat and vaporize a further heated, second richer working fluid substream with heat from a second spent rich working fluid substream, where the spent rich working fluid substreams are formed from the spent rich working fluid substream and where the third VSS heat exchange unit is adapted to further heat the heated, second richer working fluid substream with heat from a combined cooled spent rich working fluid stream and where a heated higher pressure, lean working fluid stream is fully vaporized and superheated in the HRVG and a fully vaporized rich working fluid stream is simultaneously superheated in an upper part of the HRVG, where the fully vaporized rich working fluid stream comprises a fully vaporized second richer working fluid stream and the spent lean working fluid stream to form the fully vaporized, superheated lean working fluid stream and the fully vaporized, superheated rich working fluid stream. The HESS includes a third pump and the at least one HESS heat exchange unit comprises a dual flow heat exchange unit, where the higher pressure, first leaner working fluid substream and the pre-heated richer working fluid stream are simultaneously heated by the condensing working fluid stream and where the heated richer working fluid stream is split into a first heated richer working fluid substream and a second heated richer working fluid substream and where the pre-heated, first leaner working fluid substream is combined with the first heated richer working fluid substream to form a lean working fluid stream, and where the third pump is adapted to produce the higher pressure, lean working fluid stream.

The TSS comprises a higher pressure turbine having a admission valve and a lower pressure turbine, where the higher pressure turbine is adapted to convert a portion of heat in a fully vaporized, superheated lean working fluid stream to form a spent lean working fluid stream, where the lower pressure turbine is adapted to convert a portion of heat in a fully vaporized, superheated rich working fluid stream. The at least one VSS heat exchange unit comprises a dual flow heat exchange unit, where the higher pressure, lean working fluid stream and the further heated richer working fluid stream are simultaneously heated with heat from the spent rich working fluid stream and where a heated higher pressure, lean working fluid stream is fully vaporized and superheated in the HRVG and a fully vaporized rich working fluid stream is simultaneously superheated in an upper part of the HRVG, where the fully vaporized rich working fluid stream comprises a fully vaporized second richer working fluid substream and the spent lean working fluid stream to form the fully vaporized, superheated lean working fluid stream and the fully vaporized, superheated rich working fluid stream. The HESS includes a third pump and the at least one HESS heat exchange unit comprises a dual flow heat exchange unit, where the higher pressure, first leaner working fluid substream and the pre-heated richer working fluid stream are simultaneously heated by the condensing working fluid stream and where the heated richer working fluid stream is split into a first heated richer working fluid substream and a second heated richer working fluid substream and where the pre-heated, first leaner working fluid substream is combined with the first heated richer working fluid substream to form a lean working fluid stream, and where the third pump is adapted to produce the higher pressure, lean working fluid stream.

In all of the embodiments, mixing or combining valves are used to combine stream at each point where two or more streams are combined and dividing valves are used to divide a stream at each point where a stream is divided into two or more substreams. Such valves are well known in the art.

These systems of the invention are designed to operate with a multi-component working fluid including at least one lower boiling component and at least one higher boiling component. In certain embodiments, the working fluids include an ammonia-water mixture, a mixture of two or more hydrocarbons, a mixture of two or more freon, a mixture of hydrocarbons and freon, or the like. In general, the fluid can comprise mixtures of any number of compounds with favorable thermodynamic characteristics and solubility. In certain embodiments, the fluid comprises a mixture of water and ammonia.

First Embodiment

Referring to FIG. 1A, a first embodiment of the present system and method designated CSQ-21 is described. A fully condensed basic working fluid stream S10 having parameters as at a point 1 is pumped by a first or feed pump P1 to an elevated intermediate pressure to form an intermediate pressure, basic working fluid stream S12 having parameters as at a point 2, where the basic working fluid stream comprises a fluid having at least one higher boiling component and at least one lower boiling component. The stream S12 having the parameters as at the point 2 then passes through a second heat exchanger or preheater HE2 in counterflow with a returning basic working fluid stream S14 having parameters as at a point 26 in a second heat exchange process 26-27 or 2-3 as described below to form a heated basic working fluid stream S16 having parameters as at a point 3 and a cooled returning basic working fluid stream S18 having parameters as at a point 27. The stream S16 having the parameters as at the point 3 corresponds to a state of saturated or slightly subcooled liquid.

The stream S16 having the parameters as at the point 3 then passes through a third heat exchanger or a boiled-condenser HE3, where it is heated and vaporized in counterflow with a second condensing lean combined working fluid substream S20 having parameters as at a point 11 in a third heat exchange process 11-14 or 3-8 as described below to form a heated, vaporized basic working fluid stream S22 having parameters as at a point 8, which corresponds to a state of wet vapor and a cooled second condensing combined working fluid substream S24 having parameters as at a point 14.

Meanwhile, a lean saturated liquid stream S26 having parameters as at a point 24 (see below) enters into a second pump P2, where it is pumped to a high pressure forming a high pressure lean liquid stream S28 having parameters as at a point 9. The stream S28 having the parameters as at the point 9 is then sent into a fourth heat exchanger HE4, where it is heated in counterflow with a first condensing lean combined working fluid substream S30 having parameters as at a point 12 in a fourth heat exchange process 12-13 or 9-10, (see below) to form a preheated high pressure lean liquid stream S32 having parameters as at a point 10 and a cooled first condensing combined working fluid substream S34 having parameters as at a point 13.

The stream S22 with the parameters as at the point 8 passes through a fifth heat exchanger HE5, where it is heated in counterflow by a first spent vapor substream S36 having parameters as at a point 30 in a fifth heat exchange process 30-31 or 8-4 to form a vaporized basic working fluid stream S38 having parameters as at a point 4 and a first de-super-heated vapor substream S40 having parameters as at a point 31.

The preheated high pressure lean liquid stream S32 having the parameters as at the point 10 is meanwhile sent into a sixth heat exchanger HE6, where it is heated in counterflow with a second spent vapor substream S42 having parameters as at a point 32 in a sixth heat exchange process 32-33 or 10-5 to form a second de-superheated vapor substream S44 having parameter as at a point 33 and a heated higher pressure lean liquid stream S46 parameters as at a point 5, corresponding to a state of saturated or slightly subcooled liquid.

Thereafter, the vaporized basic working fluid stream S38 having parameters as at a point 4 and the heated high pressure lean liquid stream S46 parameters as at a point 5 pass in parallel through a heat recovery vapor generator HRVG, where they are heated in counterflow by a heat source stream S48 having parameters as at a point 500 (e.g., flue gas stream, hot liquid stream, other heat source or mixtures of such streams). There are a number of HVRG heat exchange processes going on simultaneously in the HRVG. The overall heat exchange processes are 500-502 or 5-36 and 4-15 and the stepwise heat exchange processes are 500-535 or 35-36 and 34-15 and 535-502 or 5-35 and 4-34 (see below) to form a spent heat source stream S50 having parameters as at a point 502. The vaporized working fluid stream S38 having parameters as at a point 4 and the heated high pressure lean liquid stream S46 parameters as at a point 5 are thus fully vaporized and superheated in the HRVG to form a fully vaporized, superheated basic working fluid stream S52 having parameters as at a point 15 and fully vaporized, superheated high pressure lean stream S54 parameters as at a point 36, respectively.

The fully vaporized, superheated high pressure lean stream S54 having the parameters as at the point 36 is then sent into an admission valve TV, where its pressure is reduced to form a reduced pressure fully vaporized, superheated high pressure lean stream S56 having parameters as at a point 37.

Thereafter, the reduced pressure fully vaporized, superheated high pressure lean stream S56 having the parameters as at the point 37 is sent into a higher pressure turbine T1, where it expands and produces electric power to form a spent lean stream S58 having parameters as at a point 38. The spent lean stream S58 having the parameters as at the point 38 is then sent back into an upper portion of the HRVG, where it is reheated to form a reheated lean stream S60 having parameters as at a point 16. The pressure and temperature of the reheated lean stream S60 having parameters as at point 16 are equal to the pressure and temperature of the fully vaporized and superheated basic working fluid stream S52 having parameters as at the point 15 (see above).

Thereafter, the reheated lean stream S60 having the parameters of the point 16 is combined with the fully vaporized and superheated basic working fluid stream S52 having parameters as at the point 15, forming a combined working fluid stream S62 having parameters as at a point 17. The combined working fluid stream S62 having the parameters as at the point 17 then passes through a lower pressure turbine T2, where it expands and produces electric power to form a spent vapor stream S64 having the parameters as at the point 18. The spent vapor stream S64 having parameters as at the point 18 is in a state of a superheated vapor.

Thereafter, the spent vapor stream S64 having parameters as at the point 18 is divided into the substream S36 having the parameters as at the point 30 and the substream S42 having the parameters as at the point 32, respectively. As stated above, the substream S36 having the parameters as at the point 30 passes through the fifth heat exchanger HE5 and the substream S42 having the parameters as at the point 32 passes through the sixth heat exchanger HE6, where they are cooled and almost completely de-superheated forming the de-superheated substreams S40 and S44 having the parameters as at the points 31 and 33, respectively and providing heat for the heat exchange processes 8-4 and 10-5, respectively described above. The de-superheated substreams S40 and S44 having the parameters as at the points 31 and 33, respectively are then combined forming a combined de-superheated stream S66 having parameters as at a point 19.

First Alternate of First Embodiment

Figure 1B:
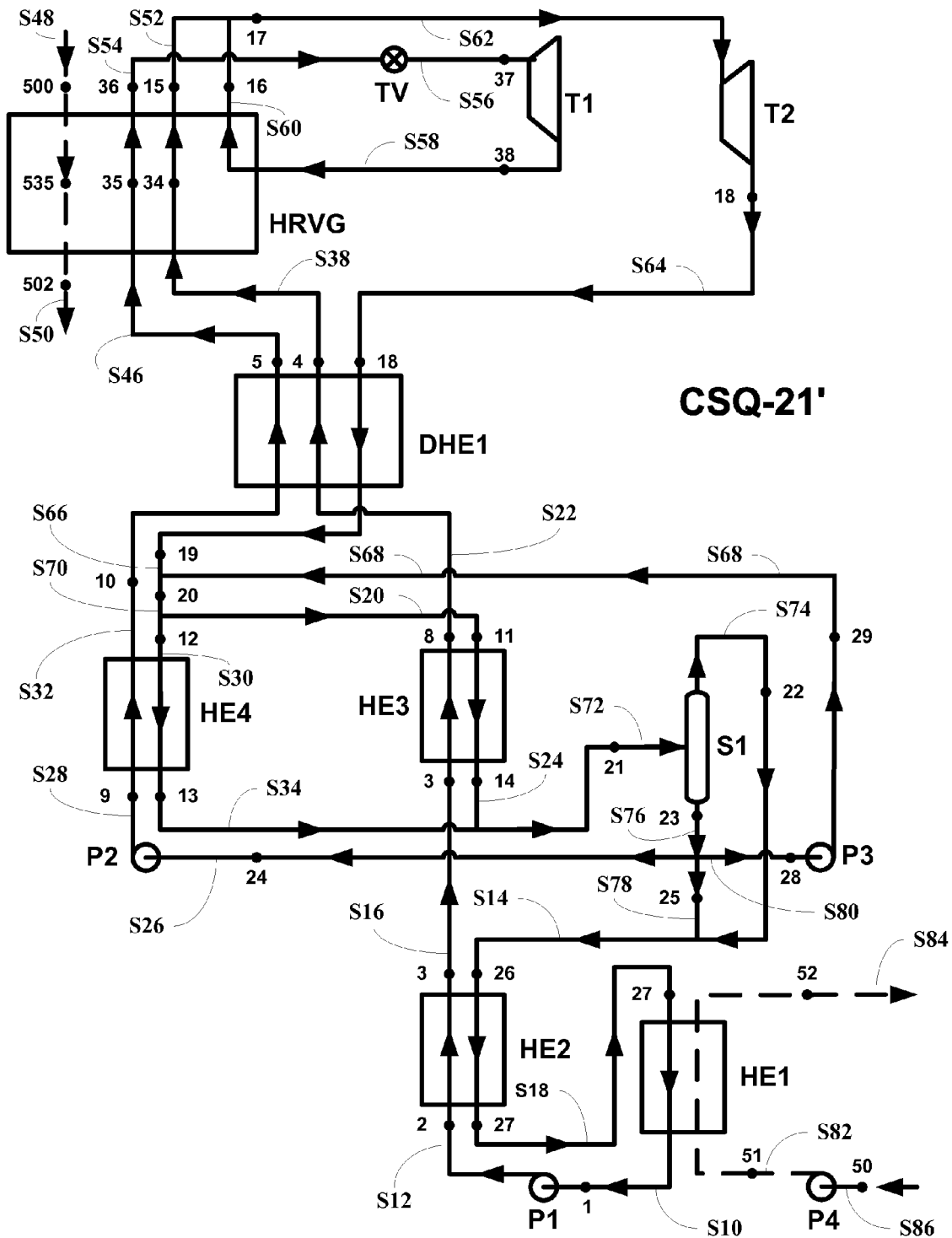
FIG. 1B depicts the embodiment of a system of FIG. 1A, where the heat exchangers HE5 and HE6 have been combined into a single, dual flow heat exchanger DHE1 designated CSQ-21'.

In an alternate embodiment of the system of this invention shown in FIG. 1B, the stream S32 having the parameters as at the point 10 and the stream S22 having the parameters as at the point 8 can be sent in parallel into a single, dual flow heat exchanger DHE1. In such a case, the spent vapor stream S64 having the parameters as at the point 18 is not divided, but is instead sent in counterflow to both the stream S32 having the parameters as at the point 10 and the stream S22 having the parameters as at the point 8 in a dual flow heat exchanger replacing the fifth and sixth heat exchangers HE5 and HE6, exiting as the de-superheated stream S66 having the parameters as at the point 19.

Second Alternate of First Embodiment

Figure 1C:
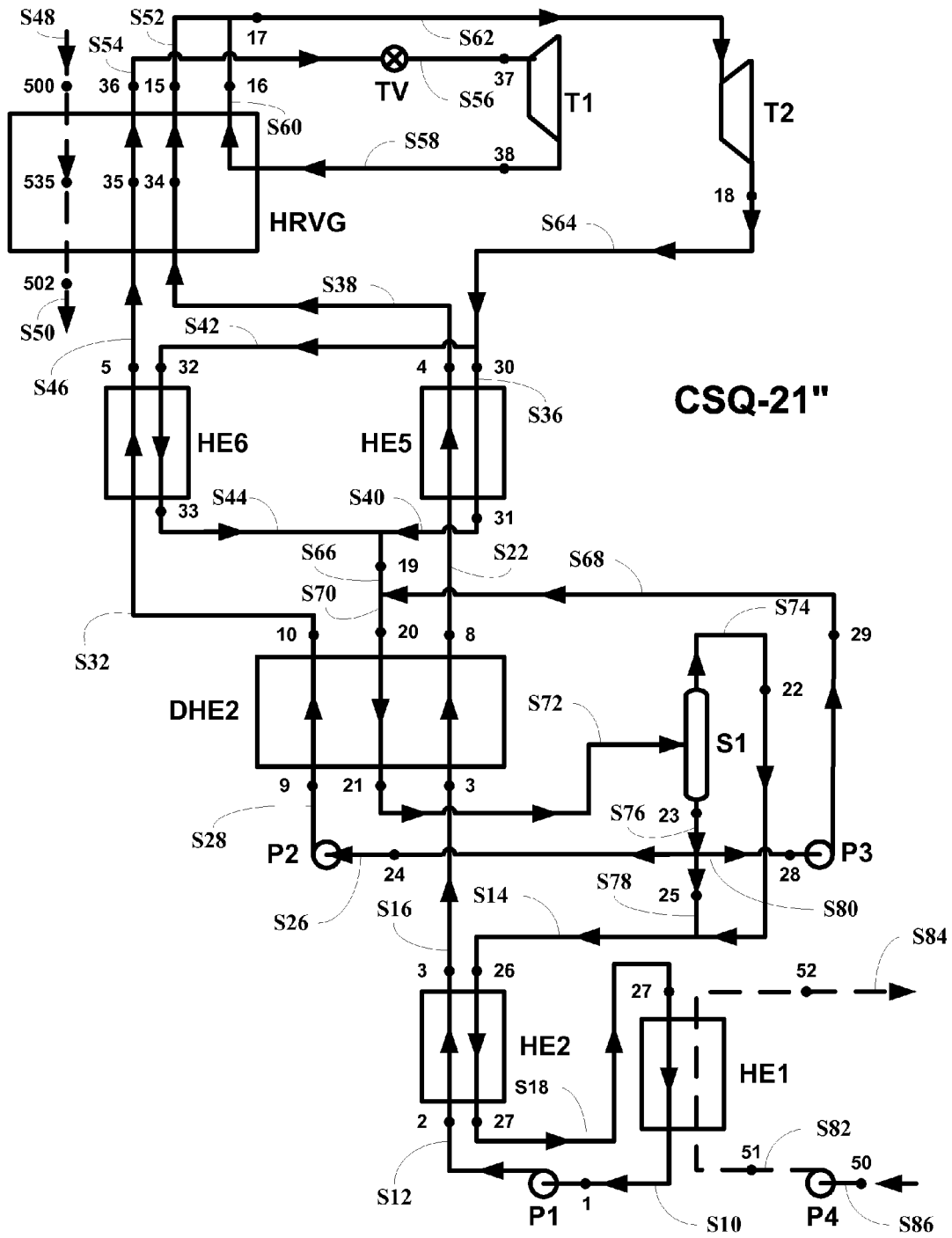
FIG. 1C depicts the embodiment of a system of FIG. 1A, where the heat exchangers HE3 and HE4 have been combined into a single, dual flow heat exchanger DHE2 designated CSQ-21".

In another alternate embodiment of the system of this invention shown in FIG. 1C, the stream S28 having the parameters as at the point 9 and the stream S16 having the parameters as at the point 3 can be sent in parallel into a single, dual flow heat exchanger DHE2. In such a case, the stream S70 having the parameters as at the point 20 is not divided, but is instead sent in counterflow to both the stream S28 having the parameters as at the point 9 and the stream S16 having the parameters as at the point 3 in a dual flow heat exchanger replacing the third and fourth heat exchangers HE3 and HE4, exiting as the partially condensed stream S72 having the parameters as at the point 21.

Third Alternate of First Embodiment

Figure 1D:
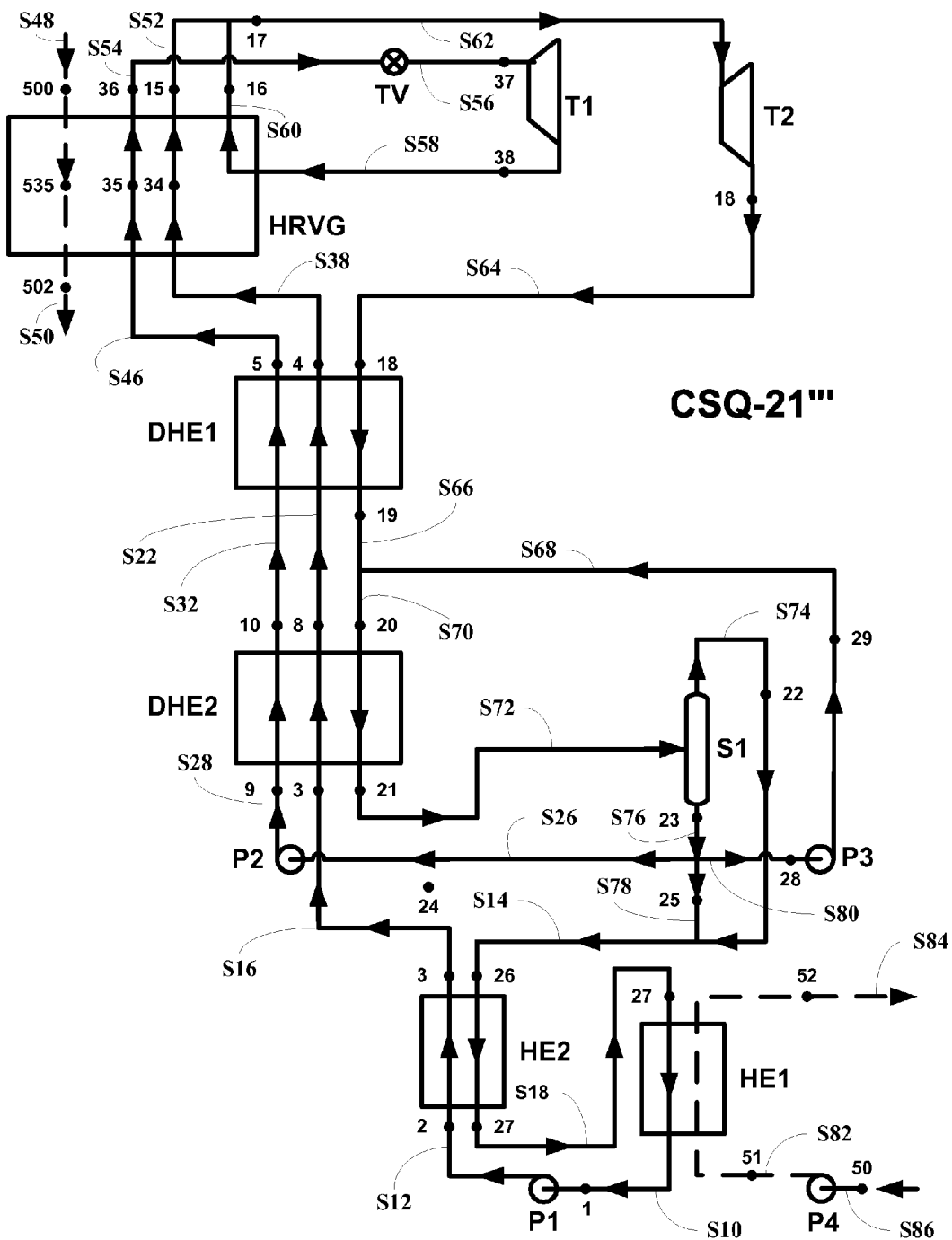
FIG. 1D depicts the embodiment of a system of FIG. 1A, where the heat exchangers HE5 and HE6 have been combined into a single, dual flow heat exchanger DHE1 and the heat exchangers HE3 and HE4 have been combined into a single, dual flow heat exchanger DHE2 designated CSQ-21'''.

In yet another alternate embodiment of the system of this invention shown in FIG. 1D, the heat exchanger HE5 and HE6 are combined into a first single, dual flow heat exchanger DHE1 and the heat exchanger HE3 and HE4 are combined into a second single, dual flow heat exchanger DHE2.

Referring again to FIG. 1A, the combined de-superheated stream S66 having the parameters as at the point 19 is in a state of slightly superheated vapor. At this point, the combined de-superheated stream S66 having the parameters as at the point 19 is mixed with a pressurized liquid stream S68 having parameters as at a point 29 as described below forming a saturated vapor stream S70 having parameters as at a point 20.

The saturated vapor stream S70 having the parameters as at the point 20 is then divided into the first substream S30 having parameters as at a point 12 and the second substream S20 having parameters as at the point 11. The second substream S20 having parameters as at the point 11 passes through the third heat exchanger HE3, where it is partially condensed, releasing heat for process 3-8 (see above) forming the stream S24 having the parameters as at the point 14.

Meanwhile, the first substream S30 having parameters as at a point 12 enters into the fourth heat exchanger HE4, where it is partially condensed, releasing heat for the heat exchange process 9-10 as described above forming the stream S34 having the parameters as at the point 13.

The stream S34 having the parameters as at the point 13 and the stream S24 having the parameters as at the point 14 are then combined forming a partially condensed working fluid stream S72 having parameters as at a point 21 corresponding to a state of vapor-liquid mixture.

The partially condensed working fluid stream S72 having parameters as at a point 21 is then sent into a flash tank or gravity separator S1, where it is separated into a saturated vapor stream S74 having parameters as at a point 22 and a saturated liquid stream S76 having parameters as at a point 23. The concentration of the lower boiling component (ammonia, in a water-ammonia working fluid) in the stream S74 having the parameters as at the point 22 is slightly higher than the concentration of the lower boiling component in the stream S10 having the parameters as at the point 1 (see above).

The stream S76 having the parameters as at the point 23 is then divided into three substreams S26, S78, and S80 having parameters as at points 24, 25 and 28, respectively. The substream S80 having the parameters as at the point 28 is then sent into a third pump P3, where it is pumped to an increased pressure to form the pressurized liquid stream S68 having the parameters as at the point 29. The pressurized liquid stream S68 having the parameters as at the point 29 is then mixed with the stream S66 having the parameters as at the point 19 to form the stream S70 having the parameters as at the point 20 (see above).

The substream S26 having the parameters as at the point 24 was meanwhile sent into the second pump P2, where its pressure is increased to a high pressure to form the stream S28 having the parameters as at the point 9 (see above).

Meanwhile, substream S78 having the parameters as at the point 25 is mixed with the vapor stream S74 having the parameters as at the point 22 to form the basic solution stream S14 having the parameters as at the point 26. The basic solution stream S14 having the parameters as at the point 26 is then sent into the second heat exchanger HE2 where it is further condensed, providing heat for heat exchange process 2-3 or 26-27 (see above) forming the stream S18 having the parameters as at the point 27.

The stream S18 having the parameters as at the point 27 is then sent into a first heat exchanger or final condenser HE1, where it is cooled and fully condensed by a coolant stream S82 having parameters as at a point 51 (e.g., air or water) in a first heat exchange process 51-52 or 27-1 (see below) to form the stream S10 having the parameters as at the point 1 and a spent coolant stream S84 having the parameters as at a point 52. The cycle is closed.

The coolant stream S82 having the parameters as at the point 51 used for the heat exchange process 27-1, is prepared from an initial coolant stream S86 having initial parameters as at a point 50, which is pumped to a higher pressure by a fourth pump P4, to form the coolant stream S82 having the parameters as at the point 51 before being is sent into the first heat exchanger HE1 as described above.

As is seen from this description, the flow rate of the working fluid passing through the second turbine T2 is equal to the sum of flow rate of the stream S10 having the parameters as at the point 1 passing through the first heat exchanger or condenser HE1, and the flow rate of stream S26 having the parameters as at the point 24. As a result of this, the total flow rate through the second turbine T2 is at least 40% higher than the flow rate of the stream S10 having the parameters as at the point 1 passing though the condenser HE1. This, in turn, substantially improves overall efficiency.

Second Embodiment

The system of this invention can also be embodied in a simplified version (designated CSQ-21s) using only one a single turbine. The simplified version can utilize high or medium temperature heat source and is depicted in FIG. 2.

This simplified embodiment of the system of this invention operates in a manner identical to the embodiment of FIG. 1 described above, until it deviated at the stream S28 having the parameter as at the point 9.

Figure 2:
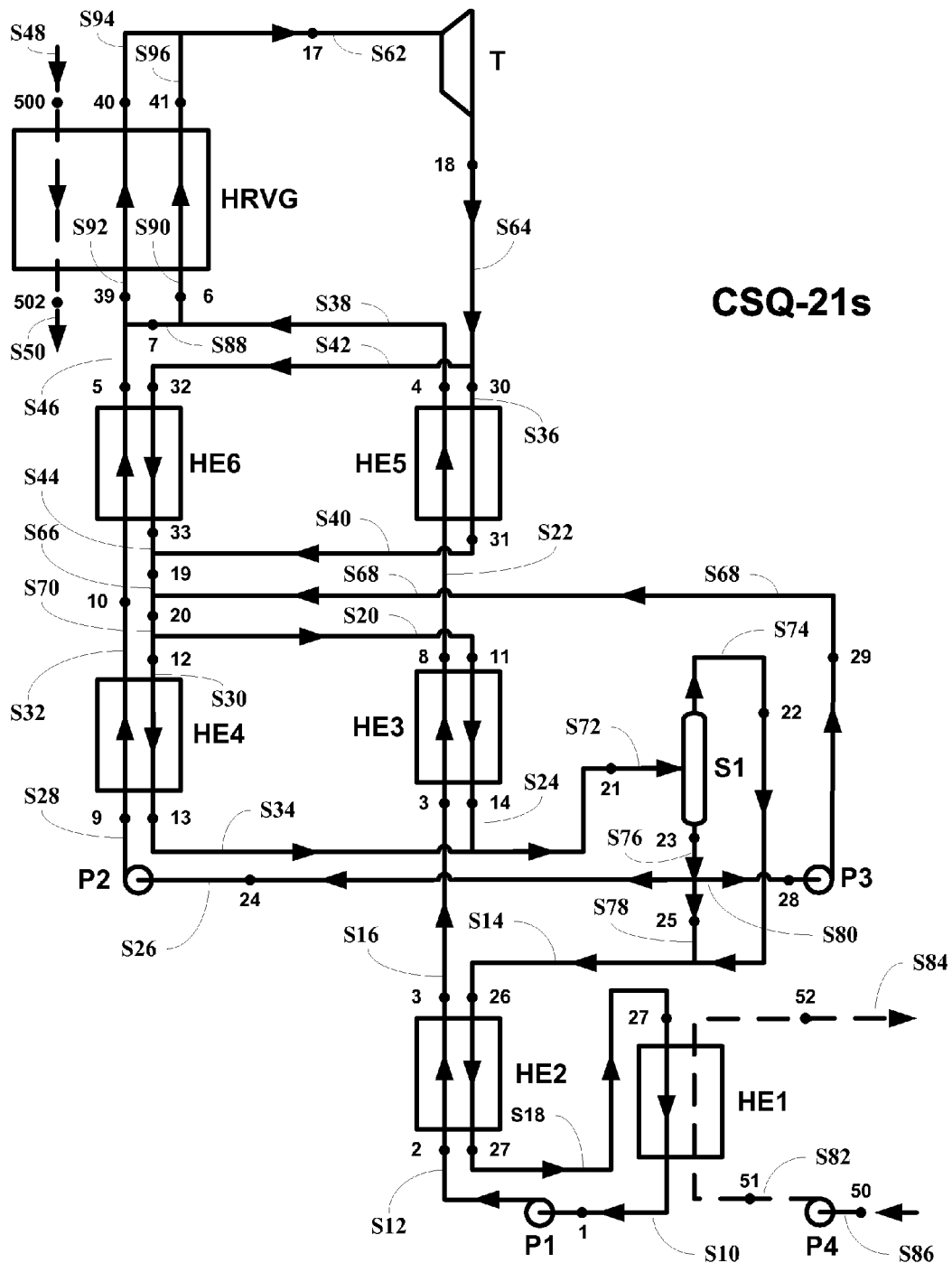
FIG. 2 depicts another embodiment of a system of this invention including dual superheated streams, a lean stream and a rich stream and a single turbine subsystem designated CSQ-21s.

In the simplified embodiment of the system of FIG. 2, the pressure at the stream S28 having the parameter as at the point 9 is approximately the same as the pressure of the stream S16 having the parameters at the point 3, in distinction to the embodiment of FIG. 1, where the pressure of the stream S28 having the parameter as at the point 9 is substantially higher than the pressure of the stream S16 having the parameters at the point 3.

Thereafter, the stream S28 having the parameter as at the point 9 enters into the fourth heat exchanger HE4, where it is heated to form the stream S32 having the parameters as at the point 10. The stream S32 having the parameters as at the point 10 then passes through the sixth heat exchanger HE6, to form the stream S46 having the final parameters as at the point 5, corresponding to a state of saturated liquid. But in this simplified system of FIG. 2, the pressures of the streams S38 and S46 having the parameters as at the points 4 and 5, respectively, are approximately equal, in distinction from the embodiment of FIG. 1, where the pressure the stream S38 having the parameters as at the at point 4 was substantially higher than the stream S46 having the parameters as at the point 5.

In the cases where the heat source stream used has a relatively low temperature, the stream S42 having the parameters as at the point 32 may not be hot enough to convert the stream S32 having the parameters as at the point 10 into the stream S46 having the parameters as at the point 5 so that it is in a state of saturated liquid in the heat exchange process 32-33 or 10-5. In this case, the stream S38 having the parameters as at the point 4 is divided into a first substream S88 having parameters as at a point 7 and a second substream S90 having parameters as at a point 6. The first substream S88 having the parameters as at the point 7 is then mixed with the stream S46 having the parameters as at the point 5 to form a richer stream S92 having the parameters as at a point 39. The substream S88 having the parameters as at the point 7 which is a portion of the stream S38 having the parameters as at the point 4 is a stream of rich solution which was previously vaporized in the third heat exchanger HE3 and the fifth heat exchanger HE5 as set described in the embodiment of FIG. 1. The richer stream S92 having the parameters as at the point 39 is now in the desired state of saturated liquid.

After being heated in the HRVG, the streams S90 and S92 having the parameters as at the points 6 and 39, respectively, produce the stream S96 having the parameters as at the point 41 and a stream S94 having the parameters as at the point 40, correspondingly. At this point, the stream S96 having the parameters as at the point 41 and the stream S94 having the parameters as at the point 40 are combined to form the stream S62 having the parameters as at the point 17. The stream S62 having the parameters as at the point 17 then passes through the single turbine T1, producing electric power, and forming the stream S64 having the parameters as at the point 18.

In the embodiment of FIG. 1 and the simplified embodiment of FIG. 2 both described above, the lean stream S46 having the parameters as at the point 5 or the rich stream S92 having the parameters as at the point 39 and the rich stream S38 having parameters as at the point 4 or the rich substream S90 having the parameters as at the point 6 are simultaneously heated as they pass through the HRVG as two parallel streams. In the embodiment of FIG. 1, the streams are combined after the lean stream is passed through the first turbine T1 of FIG. 1 and reheated in an upper part of the HRVG, while in the embodiment of FIG. 2, the streams are directly combined after exiting the HRVG, where the combined stream is passed through the single turbine T of FIG. 2. This arrangement is convenient in the case that both streams have to pass through the tubes of the HRVG, while the heat source stream S48 having the parameters as at the point 500 passes through a shell space of the HRVG resulting in simultaneous superheating of the two streams and reheating of the spent lean stream in the embodiment of FIG. 1.

In the simplified embodiment of FIG. 2, the richer stream S92 having the parameters as at the point 39 and the basic working fluid substream S90 having the parameters as at the point 6 are passed through the HRVG in parallel, where they are fully vaporized and superheated by the heat source stream S48 having the parameters as at the point 500 to form a vaporized, superheated richer stream S94 having parameters as at a point 40 and a vaporized, superheated basic working fluid substream S96 having parameters as at a point 41. The vaporized, superheated richer stream S94 having the parameters as at the point 40 and the vaporized, superheated basic working fluid substream S96 having the parameters as at the point 41 are combined to form the stream S62 having the parameters as at the point 17. Thereafter the operation of the embodiment of FIG. 2 does not differ from the operation of the embodiment of FIG. 1 described above.

In the embodiment of FIG. 1 and the simplified embodiment of FIG. 2 both described above, the lean stream S46 having the parameters as at the point 5 or the lean stream S92 having the parameters as at the point 39 and the rich stream S38 having parameters as at the point 4 or the rich substream S90 having the parameters as at the point 6 are simultaneously heated as they pass through the HRVG as two parallel streams. In the embodiment of FIG. 1, the streams are combined after the lean stream is passed through the first turbine T1 of FIG. 1 and reheated in an upper part of the HRVG, while in the embodiment of FIG. 2, the streams are directly combined after exiting the HRVG, where the combined stream is passed through the single turbine T of FIG. 2. This arrangement is convenient in the case that both streams have to pass through the tubes of the HRVG, while the heat source stream S48 having the parameters as at the point 500 passes through a shell space of the HRVG resulting in simultaneous superheating of the two streams and reheating of the spent lean stream in the embodiment of FIG. 1.

The streams S46 having parameters as at the point 5 or the stream S92 having the parameters as at the point 39 and the stream S38 having the parameters as at the point 4 or the stream S90 having the parameters as at the stream 6 are both in single phase state, which makes their distribution to and through the multiple tubes of the HRVG simple.

Third Embodiment

Figure 3:
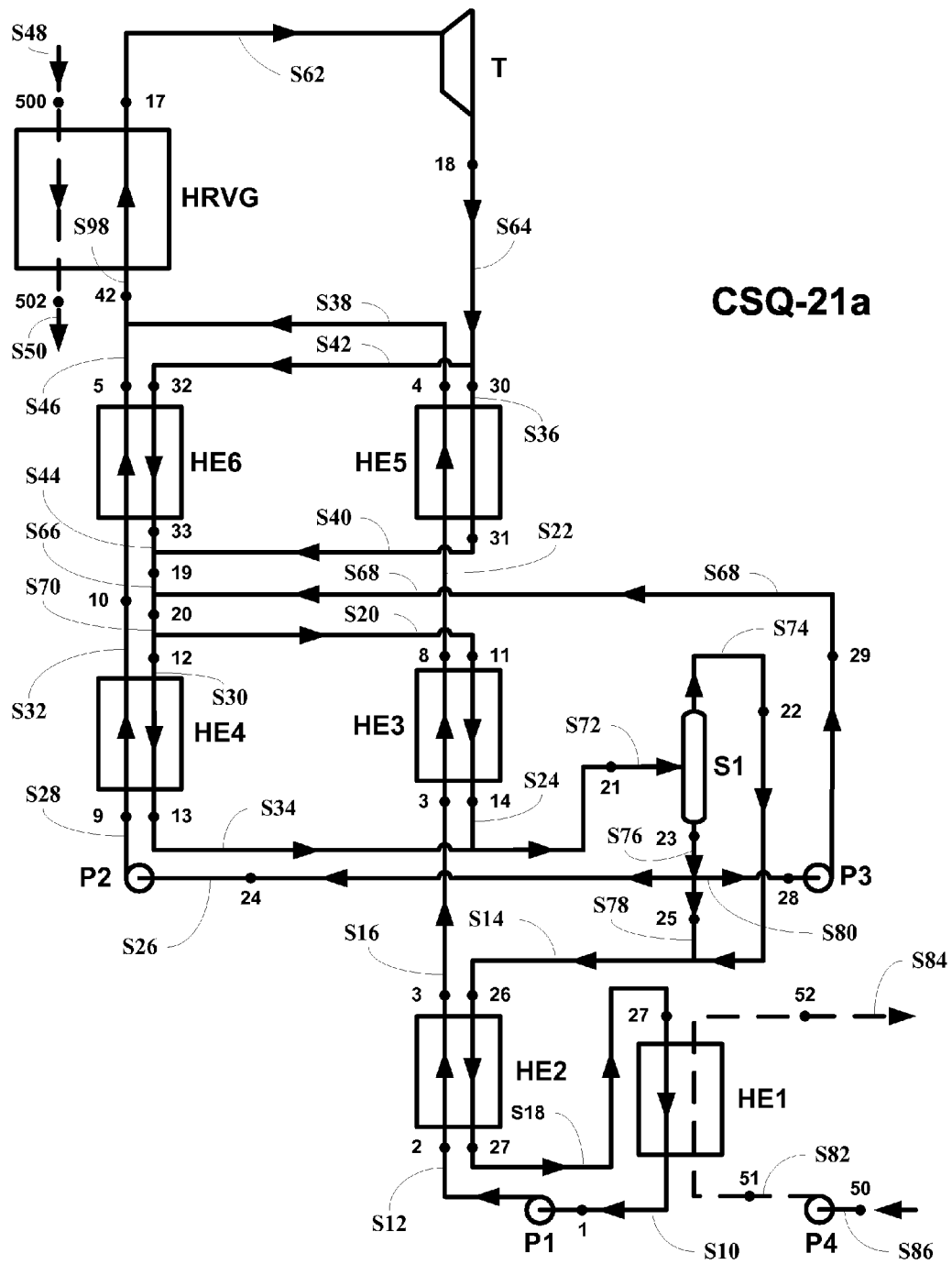

In an alternate embodiment, the heat source stream S48 having the parameters as at the point 500 pass through the tubes of the HRVG. In such an arrangement, the stream S38 having the parameters as at the point 4 and the stream S46 having the parameters as at the point 5 can be combined into a single stream S98 having parameters as at a point 42 before entering into the HRVG as shown in FIG. 3. This variant is referred to as variant CS-21a. This combined stream S98 having the parameters as at the point 42, then exits the HRVG as the vaporized and superheated stream S62 having the parameters as at the point 17.

This simplified version of the system has a lower efficiency than the embodiments of FIG. 1 and FIG. 2 described above, but is substantially simpler (having just one turbine) and is able to work with a wider range of initial heat source temperatures.

The embodiments of FIG. 2 and FIG. 3 can also be altered as set forth in FIGS. 1B-D.

Efficiencies and Cost Savings

The system of the present invention, in its full embodiment form of FIG. 1A and its variant embodiments of FIG. 1B, FIG. 1C, FIG. 1D, FIG. 2 and FIG. 3, has an efficiency which is lower than the efficiency of our previously systems for these temperature ranges (See U.S. patent application Ser. Nos. 10/983,970 filed Nov. 8, 2004, 11/099,211 filed Apr. 5, 2005, and 11/235,654 filed Sep. 22, 2005; however, the advantage of the systems of the present invention are their relative simplicity and therefore substantially reduced capital costs.

The basic system proposed here, working in combination with a recirculating combustion subsystem (RCSS) as set forth in U.S. Pat. No. 7,350,471-B2 incorporated herein by reference (even though all references are incorporated per the last paragraph of the specification), achieves an efficiency of about 39.61% and an LHV efficiency of about 38.99%. These efficiencies are attained with relatively small plants, using turbines with relatively low efficiencies; however, it should be noted that the efficiencies achieved are none the less substantially higher than what is possible with large, base load, Rankine cycle plants.

The simplified embodiments of the system of this invention, likewise working with an RCSS as set forth in U.S. Pat. No. 7,350,471-B2 incorporated herein by reference, offer efficiencies of about 35.56% and LHV efficiencies of about 34.97%.

The simplified embodiments of the system of this invention are particularly suitable for small scale plants using a biomass fuel source. By comparison, the most efficient Rankine cycle biomass plant currently in operation has an efficiency of only slightly better than 26%.

The simplified embodiments of the system of this invention are also suitable for solar-thermal applications. In large scale solar-thermal applications (using high efficiency turbines and a heat source temperature of about 806° F.), the simplified versions attain an efficiency of about 33.15%. For solar thermal applications implemented in a small plant and correspondingly using low efficiency turbines, the simplified embodiments of the system of this invention can result in an efficiency is about 29.76%. By way of comparison, a Rankine cycle solar thermal plant would have an efficiency of about 27% for large scale plant and about 24% for small scale plant. This increase in efficiency over Rankine cycle plants correlates directly to increased power output or decreased solar collection apparatus costs.

An additional advantage of the simplified embodiments of the system of this invention is that they utilize a single low pressure turbine having an inlet pressure in the range between about 650 psi and 720 psi, with no vacuum stage so that an exit pressure is in the range between about 110 and about 130 psi.

New Embodiments

In one of the previous embodiments designated CSQ-21, the embodiment included two turbines, a high pressure turbine and a low pressure turbine.

In the previous embodiments, only a lean solution stream S56 was circulated through the high pressure turbine T1, whereas a single working solution stream S62 formed from a lean solution stream S58 and a rich solution stream S52 was circulated through the low pressure turbine T2.

The efficiency of the CSQ-21 embodiments can be substantially increased, if a flow rate of the stream S56 circulating through the high pressure turbine T1 is increased.

The present invention now also relates to a new embodiment designated CSQ-21g, which is designed to increase the efficiency of the CSQ-21 embodiments by increasing the flow rate of the stream S56 through the high pressure turbine T1.

Referring now to FIG. 4, the new embodiment of the system of this invention is shown and described with respect thereto. According to the new embodiment, a fully condensed basic or richer working fluid stream S10 having parameters as at a point 1 and corresponding to a richer working solution of a multi-component fluid (higher concentration of the lower boiling point component) is pumped by a feed pump P1, to a required elevated pressure forming a higher pressure, basic or richer working fluid stream S12 having parameters as at a point 2. The richer working fluid stream S12 having the parameters as the point 2 is then sent through a pre-heater or second heat exchange unit HE2, where it is pre-heated in counterflow with a returning richer working fluid stream S14 having parameters as at a point 26 in a second heat exchange process 2-3 or 26-27 (as described below) to form a pre-heated or heated, richer working fluid stream S16 having parameters as at a point 3 and a cooled returning richer working fluid stream S18 having parameters as at a point 27. The richer working fluid stream S16 having the parameters as at the point 3 corresponds to or close to a state of saturated liquid, where the term close means that the parameters of the richer working fluid stream S16 having the parameters as at the point 3 are within about 10% of being in the state of a saturated liquid. In certain embodiments, the parameters of the richer working fluid stream S16 having the parameters as at the point 3 are within about 5% of being in the state of a saturated liquid.

Thereafter, the richer working fluid stream S16 having the parameters as at the point 3 is sent through a recuperative boiler-condenser or third heat exchange unit HE3, where it is vaporized in counterflow with a second lean condensing working fluid substream S20 having parameters as at a point 11 in a third heat exchange process 3-8 or 11-14 (as described below) to from a vaporized richer working fluid stream S22 having parameters as at a point 8 and a cooled second lean condensing working fluid substream S24 having parameters as at a point 14. The richer working fluid stream S22 having the parameters as at the point 8 corresponds to a state of wet vapor, where a wetness of the richer working fluid stream S22 having the parameters as at a point 8 varies between 2% to 7%.

At the same time, a cooler rich working fluid stream S66 having parameters as at a point 19 is de-superheated by an injection of a pressurized liquid leaner working fluid stream S68 having parameters as at a point 29 (as described below) to form a lean condensing working fluid stream S70 having parameters as at a point 20. The lean condensing working fluid stream S70 having the parameters as at the point 20 corresponds to a state of dry saturated vapor, while the cooler rich working fluid stream S66 having the parameters as at the point 19 corresponds to a state of slightly superheated vapor, where the term slightly means that the stream has a temperature no more than about 20° C. above its vaporization temperature.

The lean condensing working fluid stream S70 having the parameters as at the point 20 is then divided into a first lean condensing working fluid substream S30 having parameters as at a point 12 and the second lean condensing working fluid substream S20 having the parameters as at the point 11.

The second lean condensing working fluid substream S20 having the parameters as at the point 11 then passes through the third heat exchange unit HE3 where it is partially condensed, providing heat for the third heat exchange process 3-8 or 11-14 to form the cooled second lean condensing working fluid substream S24 having parameters as at a point 14 (as described above).

The first lean condensing working fluid substream S30 having the parameters as at the point 12 meanwhile passes through a recuperative pre-heater or fourth heat exchange unit HE4, where it is partially condensed, providing heat for a fourth heat exchange process 12-13 or 9-10 (as described below) to form a cooled first lean condensing working fluid substream S34 having parameters as at a point 13.

Thereafter, the cooled first lean condensing working fluid substream S34 having the parameters as at the point 13 and the second lean condensing working fluid substream S24 having the parameters as at the point 14 are combined to form a partially condensed, lean condensing working fluid stream S72 having parameters as at a point 21. The partially condensed, lean condensing working fluid stream S72 having the parameters as at the point 21 is then sent into a flash tank S1. In the flash tank S1, the partially condensed, lean condensing working fluid stream S72 having the parameters as at the point 21 is separated into a saturated rich vapor stream S74 having parameters as at a point 22 and a saturated liquid leaner working fluid stream S76 having parameters as at a point 23.

The saturated liquid, leaner working fluid stream S76 having the parameters as at the point 23 is then divided into three leaner working fluid substreams S26, S78 and S80 having parameters as at points 24, 25 and 28, respectively.

The leaner working fluid substream S78 having the parameters as at the point 25 is combined with the rich vapor stream S74 having the parameters as at the point 22 (as described above) forming the returning basic or richer working fluid stream S14 having the parameters as at the point 26. The richer working fluid stream S14 having the parameters as at the point 26 then passes through the second heat exchange unit HE2, where it condensed and cooled, providing heat for the second heat exchange process 2-3 or 26-27 to form the pre-heated or heated, basic or richer working fluid stream S16 having the parameters as at the point 3 and the cooled returning basic or richer working fluid stream S18 having the parameters as at the point 27 (as described above).

Thereafter, the cooled returning basic or richer working fluid stream S18 having the parameters as at the point 27 is fully condensed in a final condenser or first heat exchange unit HE1, in counterflow with a coolant stream S82 (air or water) having parameters as at a point 51 in a first heat exchange process 27-1 or 51-52 to form the fully condensed basic or richer working fluid stream S10 having parameters as at the point 1 (see above) and a spent coolant stream S84 having parameters as at a point 52. The coolant stream S82 can be pressurized if needed by a pump or fan P4.

Meanwhile, the leaner working fluid substream S80 having the parameters as at the point 28 (as described above) is pumped by a recirculating pump P3 to a pressure equal to a pressure of the cooler, rich working fluid stream S66 having the parameters as at the point 19 forming the pressurized, liquid leaner working fluid substream S68 having parameters as at the point 29. The pressurized, liquid leaner working fluid substream S68 having the parameters as at the point 29 is then mixed with the cooler rich working fluid stream S66 having the parameters as at the point 19, de-superheating the cooler rich working fluid stream S66 having the parameters as at the point 19, and forming the lean condensing working fluid stream S70 having the parameters as at the point 20 (as described above).

A pressure of the lean condensing working fluid stream S72 having the parameters as at the point 21 is defined by a pressure of condensation in the first heat exchange unit HE1 and is only slightly higher than a pressure of the richer working fluid stream S10 having the parameters as at the point 1. A temperature the lean condensing working fluid stream S72 having the parameters as at the point 21 must be chosen in such a way that a composition of the rich vapor stream S74 having the parameters as at the point 22 has a higher concentration of the lower boiling point component or has the same composition as the basic or richer working solution stream S10 having the parameters as at the point 1. A temperature of the richer working fluid stream S16 having the parameters as at the point 3 (the boiling temperature of the richer or basic working fluid) must be lower than a temperature of the lean condensing working fluid stream S72 having the parameters as at the point 21. Therefore, a pressure of the richer working fluid stream S16 having the parameters as at the point 3 is fixed at the boiling pressure corresponding to the temperature of the richer working fluid stream S16 having the parameters as at the point 3. As a result, an inlet pressure in the low pressure turbine T2 of the new embodiment, which must always be lower than the pressure of the rich working fluid stream S16 having the parameters as at the point 3, is limited and cannot be increased in the framework of the system.

Up to this point, the new embodiment is essentially the same as the embodiments designed CSQ-21 described above.

In distinction to the embodiment designated CSQ-21, the leaner working fluid substream S26 having the parameters as at the point 24 is now pumped by a recirculating pump P2 to an elevated pressure approximately equal to the pressure of the richer working fluid stream S16 having the parameters as at the point 3 to form a pressurized leaner working fluid substream S28 having parameters as at a point 9. This pumping process is identical to the pumping process used in the single turbine embodiments designated CSQ-21s or CSQ-21a and further designated as CS-21, but the pumping process differs from the pumping process in the embodiments designated CSQ-21, CSQ-21', CSQ-21", or CSQ-21'''.

Now, the leaner working fluid substream S28 having the parameters as at the point 9 is sent into the fourth heat exchange unit HE4, where it is heated in the fourth heat exchange process 9-10 or 12-13 in counterflow with the first lean condensing working fluid substream S30 having the parameters as at the point 12 to form a heated leaner working fluid stream S32 having parameters as at a point 10 and the cooled, lean condensing substream S34 having the parameters as at the point 13. The heated leaner working fluid stream S32 having the parameters as at the point 10 corresponds to a state of subcooled liquid (as described above).

A pressure of the heated leaner working fluid stream S32 having the parameters as at the point 10 is the same as, or slightly lower pressure than a pressure of the richer working fluid stream S22 having the parameters as at the point 8, where slightly lower means that the pressure is within about 10% of each other.

Now, the richer working fluid stream S22 having the parameters as at the point 8 (as described above) is then divided into a first heated richer working fluid substream S100 having parameters as at a point 6 and a second heated richer working fluid substream S92 having parameters as at a 7. The first heated richer working fluid substream S100 having the parameters as at the point 6 is now mixed with the heated leaner working fluid stream S32 having the parameters as at the point 10 (as described above). Due to the fact that the heated leaner working fluid stream S32 having the parameters as at the point 10 is in a state of subcooled liquid and that the first heated richer working fluid substream S100 having the parameters as at the point 6 is in a state of wet vapor, the first heated richer working fluid substream S100 having the parameters as at the point 6 is fully absorbed by the heated leaner working fluid stream S32 having the parameters as at the point 10, forming a lean working fluid stream S88 having parameters as at a point 16. The lean working fluid stream S88 having the parameters as at the point 16 corresponds to a state of saturated liquid.

As a result of the absorption of the first heated richer working fluid substream S100 having the parameters as at the point 6 into the heated leaner working fluid stream S32 having the parameters as at the point 10, a temperature of the lean working fluid stream S88 having the parameters as at the point 16 is higher than the temperature of the richer working fluid stream S22 having the parameters as at the point 8 as well as the temperature of the first heated richer working fluid substream S100 having the parameters as at the point 6 and the second heated richer working fluid substream S92 having the parameters as at the point 7.

Thereafter, the lean working fluid stream S88 having the parameters as at the point 16 is then pumped to a desired higher pressure by a feed pump P5 to form a pressurized lean working fluid stream S90 having parameters as at a point 34. In distinction from the pressure of the rich working fluid stream S16 having the parameters as at the point 3 (as described above), a pressure of the pressurized, lean working fluid stream S90 having the parameters as at the point 34 is limited only by technological considerations (the ability of the heat exchangers to handle the pressure) and is the subject of case-by-case technical and economic optimization.

The pressurized, lean working fluid stream S90 having parameters as at a point 34 is then sent into a recuperative heat exchanger or sixth heat exchange unit HE6, where it is heated in counterflow with a first spent vapor rich working fluid substream S42 having parameters as at a point 32 in a sixth heat exchange process 34-5 or 32-33 (as described below) to form a heated lean working fluid stream S46 having parameters as at a point 5.

The heated lean working fluid stream S46 having the parameters as at the point 5 then passes through a heat recovery vapor generator HRVG, where it is further heated, vaporized and superheated by a heat-source stream S48 having parameters as at a point 500 in a heat recovery vapor generator heat exchange process 5-35-36 or 500-535-502 to form a fully vaporized and superheated lean working fluid stream S54 having parameters as at a point 36.

The fully vaporized and superheated lean working fluid stream S54 having the parameters as at the point 36 is then sent through an admission valve TV, where its pressure is reduced to form a reduced pressure, fully vaporized and superheated lean working fluid stream S56 having parameters as at a point 37. The reduced pressure, fully vaporized and superheated lean working fluid stream S56 having the parameters as at the point 37 is then sent through the high pressure turbine T1, where it is expanded and a portion of its heat converted to a useable from of energy such as electric energy or power forming a spent lean working fluid stream S58 having parameters as at a point 38.

Meanwhile, the richer working fluid substream S92 having the parameters as at the point 7 (as described above) passes through a recuperative heat exchanger or a seventh heat exchange unit HE7, where it is fully vaporized and superheated in counterflow with a cooled spent vapor rich working fluid stream S96 having parameters as at a point 40 in a seventh heat exchange process 7-15 or 40-19, (as described below) to form a fully vaporized and superheated richer working fluid stream S94 having parameters as at a point 15 and the cooler spent rich working fluid stream S66 having the parameters as at the point 19.

The fully vaporized and superheated richer working fluid stream S94 having parameters as at a point 15 is then sent into a recuperative heat exchanger or fifth heat exchange unit HE5, where it is heated in counterflow with a first spent rich working fluid substream S36 having parameters as at a point 30 in a fifth heat exchange process 15-4 or 30-31 (as described below) to form a further superheated richer working fluid stream S38 having parameters as at a point 4 and a cooled spent rich working fluid substream S40 having parameters as at a point 31. A pressure of the further superheated richer working fluid stream S38 having the parameters as at the point 4 and a pressure of the spent lean working fluid stream S58 having the parameters as at the point 38 are the same.

The further superheated richer working fluid stream S38 having the parameters as at the point 4 and the spent lean working fluid stream S58 having the parameters as at the point 38 are then combined into a rich working fluid stream S98 having parameters as at a point 39. The rich working fluid stream S98 having the parameters as at the point 39 is then sent into the heat recovery vapor generator HRVG, where it is heated by the heat source stream S48 having the parameters as at the point 500 in a second heat recovery vapor generator heat exchange process 39-17 or 500-535 to form a fully vaporized and superheated rich working fluid stream S62 having parameters as at a point 17.

Thereafter, the superheated rich working fluid stream S62 having parameters as at a point 17 is then sent into a low pressure turbine T2, where it is expanded and a portion of its heat converted to a useable from of energy such as electric energy or power forming a spent rich working fluid stream S64 having parameters as at a point 18.

The spent rich working fluid stream S64 having the parameter as at the point 18 is then divided into a first spent rich working fluid substream S36 having the parameters as at a point 30 and a second spent rich working fluid substream S42 having the parameters as at the point 32.

The second spent rich working fluid substream S42 having the parameters as at the point 32 the passes through the sixth heat exchange unit HE6, where it is cooled, providing heat for the sixth heat exchange process 32-33 or 34-5 (as described above) to form a cooled second spent rich working fluid stream S44 having parameters as at a point 33.

The first spent rich working fluid stream S36 having the parameters as at the point 30 then passes through the fifth heat exchange unit HE5, where it is cooled, providing heat for the fifth heat exchange process 30-31 or 15-4 (as described above) to form a cooled first spent rich working fluid stream S40 having the parameters as at a point 31.

A temperature and pressure of the cooled second spent rich working fluid stream S44 having the parameters as at the point 33 and the cooled first spent rich working fluid stream S40 having the parameters as at the point 31 are the same. Thereafter, the cooled second spent rich working fluid stream S44 having the parameters as at the point 33 and the cooled first spent rich working fluid stream S40 having the parameters as at the point 31 are combined, forming a combined cooled spent rich working fluid stream S96 having with parameters as at point 40.

The combined cooled spent rich working fluid stream S96 having the parameters as at the point 40 then enters into the seventh heat exchange unit HE7, where it is further cooled, providing heat for the seventh heat exchange process 7-15 or 40-19 (as described above) to form the cooler spent rich working fluid stream S66 having the parameters as at the point 19.

The lean condensing working fluid stream S70 having the parameters as at the point 20 is then divided into the first lean condensing working fluid substream S30 having parameters as at a point 12 and the second lean condensing working fluid substream S20 having parameters as at the point 11. The second lean condensing working fluid substream S20 having parameters as at the point 11 passes through the third heat exchanger HE3, where it is partially condensed, releasing heat for the third heat exchange process 3-8 or 11-14 (as described above) forming the cooled second lean condensing working fluid substream S24 having the parameters as at the point 14.

Meanwhile, the first lean condensing working fluid substream S30 having parameters as at a point 12 enters into the fourth heat exchanger HE4, where it is partially condensed, releasing heat for the fourth heat exchange process 9-10 or 12-13 (as described above) forming the cooled first lean condensing working fluid substream S34 having the parameters as at the point 13.

The cooled first lean condensing working fluid substream S34 having the parameters as at the point 13 and the cooled second lean condensing working fluid substream stream S24 having the parameters as at the point 14 are then combined forming a partially condensed lean condensing working fluid stream S72 having parameters as at a point 21 corresponding to a state of vapor-liquid mixture.

The partially condensed, lean condensing working fluid stream S72 having parameters as at a point 21 is then sent into a flash tank or gravity separator S1, where it is separated into a saturated rich vapor stream S74 having parameters as at a point 22 and a saturated liquid leaner working fluid stream S76 having parameters as at a point 23. The concentration of the lower boiling component (ammonia, in a water-ammonia working fluid) in the rich vapor stream S74 having the parameters as at the point 22 is the same or slightly higher than the concentration of the lower boiling component in the richer working fluid stream S10 having the parameters as at the point 1 (as described above).

Due to the absorption of the richer working fluid substream S100 having the parameters as at the point 6 by the leaner working fluid substream S32 having the parameters as at the point 10, the flow rate through the lean turbine T1 is increased. This increase in the flow rate of the lean working fluid stream S56 into the lean turbine T1 requires an increase of the quantity of heat delivered to the lean working fluid stream S46 having the parameters as at the point 5 and the rich working fluid stream S98 having the parameters as at the point 39 by the external heat source S48 having the parameters as at the point 500. At the same time, heat rejection into the ambient in the first heat exchange unit HE1 does not change at all. As a result, a power output and a corresponding efficiency of the system is increased in comparison with the initial two-turbine version of the system designated CSQ-21.

The composition of the six fluids used in the system designated CSQ-21g are set forth below relative to their leanness or richness, where lean streams are streams that have a higher concentration of the higher boiling point components of the multi-component fluid that is used initially, while the rich streams are streams that have a higher concentration of the lower boiling point components of the multi-component fluid. Table I ranks that stream in according to their rich or lean characteristic. The ranking is relative and not absolute. The composition are designate: WF1 including stream S74; WF2 including streams S10, S12, S14, S16, S18, S22, S92, S94, S100 and S38; WF3 including streams S98, S62, S64, S36, S40, S42, S44, S96, and S66; WF4 includes streams S88, S90, S46, S54, S56, and S58; WF5 including streams S70, S20, S24, S30, S34, and S72; and WF6 including streams S26, S28, S32, S76, S78, S80, and S68.

TABLE I

Compositional Ranking of Stream of CSQ-21g

| Richest | | | → | | Leanest |
|---|---|---|---|---|---|
| WF1 | WF2 | WF3 | WF4 | WF5 | WF6 |

Although the composition of WF1 and WF2 are ranked with WF1 richer than WF2, the composition of WF1 and WF2 can be equal or have the same or substantially the same rank, substantially means within about 10%, and in certain embodiments within about 5%. Although the compositions of WF4 and WF5 are ranked with WF4 richer than WF5, the ranking could be reversed or the two composition could be the same or substantially similar depending on the relative flow rates of the streams used to form them, where substantially means that the compositions are with about 10% of being identical.

The overall efficiency of the new embodiment set forth above will increase with an increase in an inlet pressure of the stream S56 into the lean turbine T1. The efficiency of the system designated CSQ-21g are given below in Table II:

TABLE II

T1 Inlet Pressure versus Net Efficiency of CSQ-21g

| T1 Inlet Pressure (psi) | Net Efficiency (%) |
|---|---|
| 1975 | 44.09 |
| 2250 | 44.49 |
| 2500 | 44.78 |
| 2750 | 45.02 |
| 3000 | 45.21 |
| 3500 | 45.51 |

These efficiencies are higher than the efficiencies of large base-load super-critical Rankine cycle power plants, which have net efficiencies of no more than about 42-43%. However here, these efficiencies are achieved in a relatively simple system. Even at conventional pressure of 2250 psi (150 bar), the net efficiency CSQ-21g exceeds the net efficiency of a supercritical Rankine cycle power plant by almost 6%.

First Alternate of New Embodiments

Figure 4A:
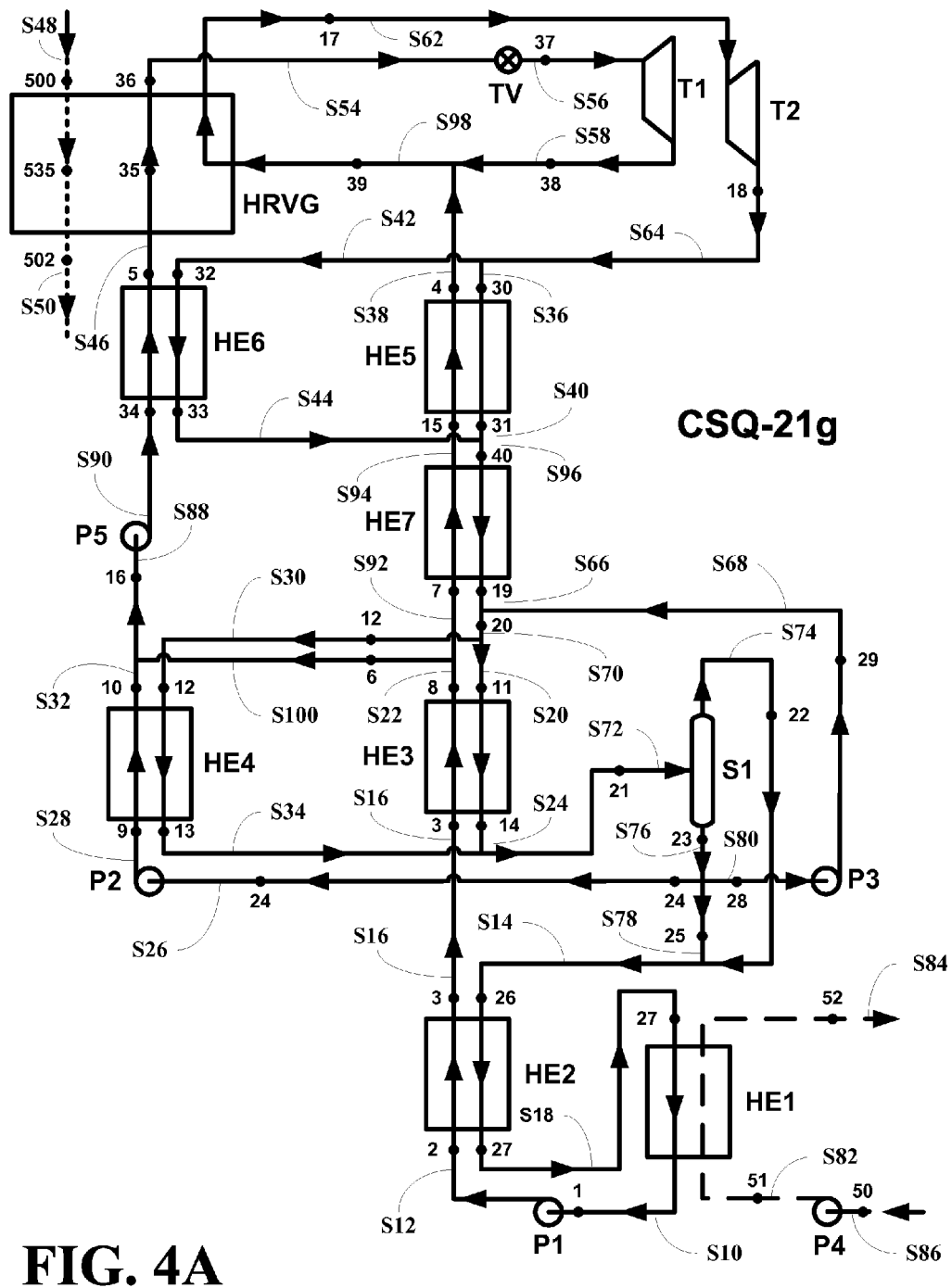
FIG. 4A depicts another embodiment of a system of this invention including a single superheated stream and a single turbine subsystem designated CSQ-21g.
Figure 4B:
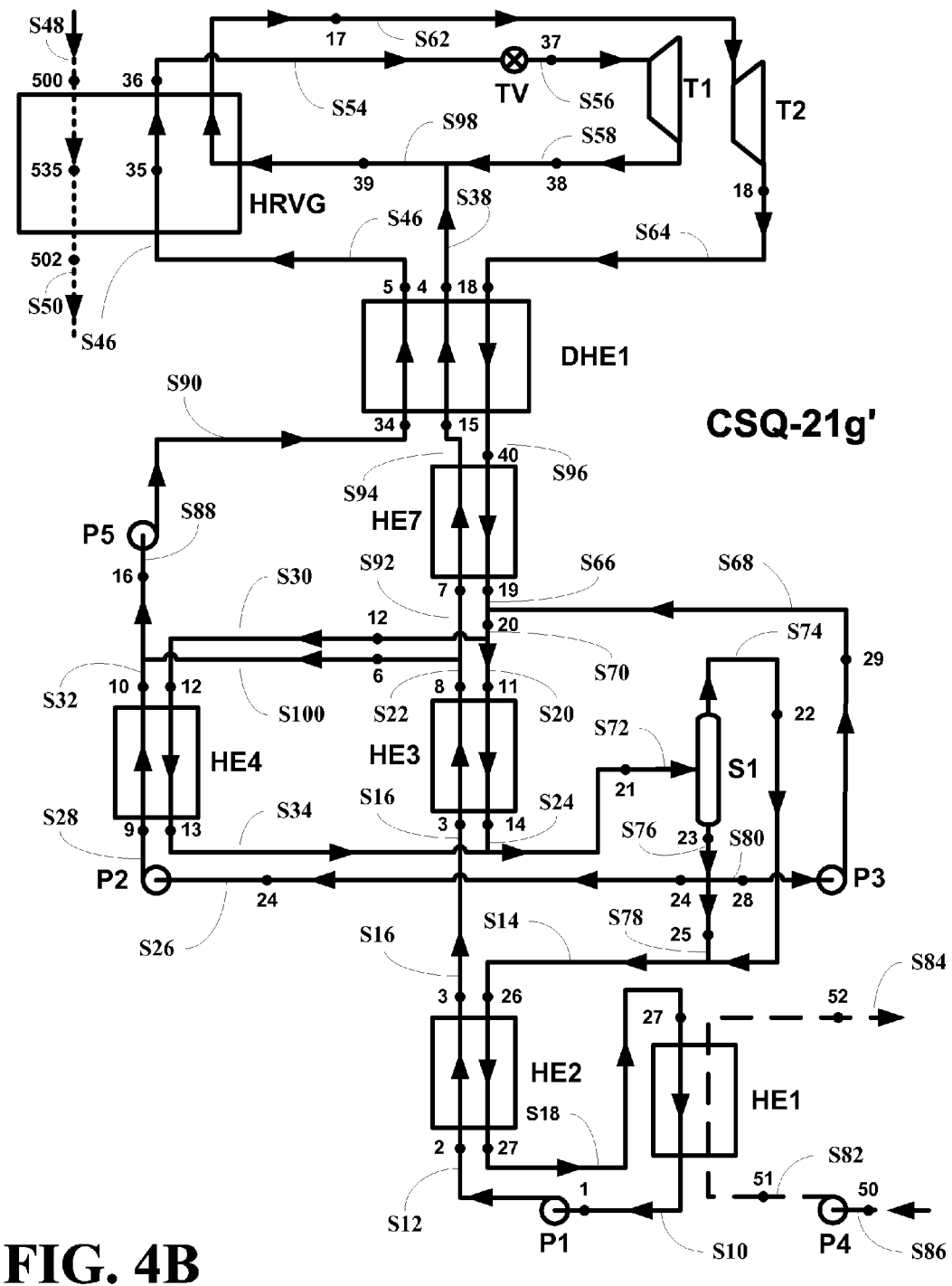
FIG. 4B depicts the embodiment of a system of FIG. 4A, where the heat exchangers HE5 and HE6 have been combined into a single, dual flow heat exchanger DHE1 designated CSQ-21g'.

In an alternate embodiment of the system of this invention shown in FIG. 4B, the lean working fluid stream S90 having the parameters as at the point 34 and the richer working fluid stream S94 having the parameters as at the point 15 can be sent in parallel into a single, dual flow heat exchanger DHE1. In such a case, the spent vapor rich working fluid stream S64 having the parameters as at the point 18 is not divided, but is instead sent in counterflow to both the stream S90 having the parameters as at the point 34 and the stream S94 having the parameters as at the point 15 in a dual flow heat exchanger DHE1 replacing the fifth and sixth heat exchange units HE5 and HE6, exiting as the de-superheated stream S96 having the parameters as at the point 40.

Second Alternate of New Embodiments

Figure 4C:
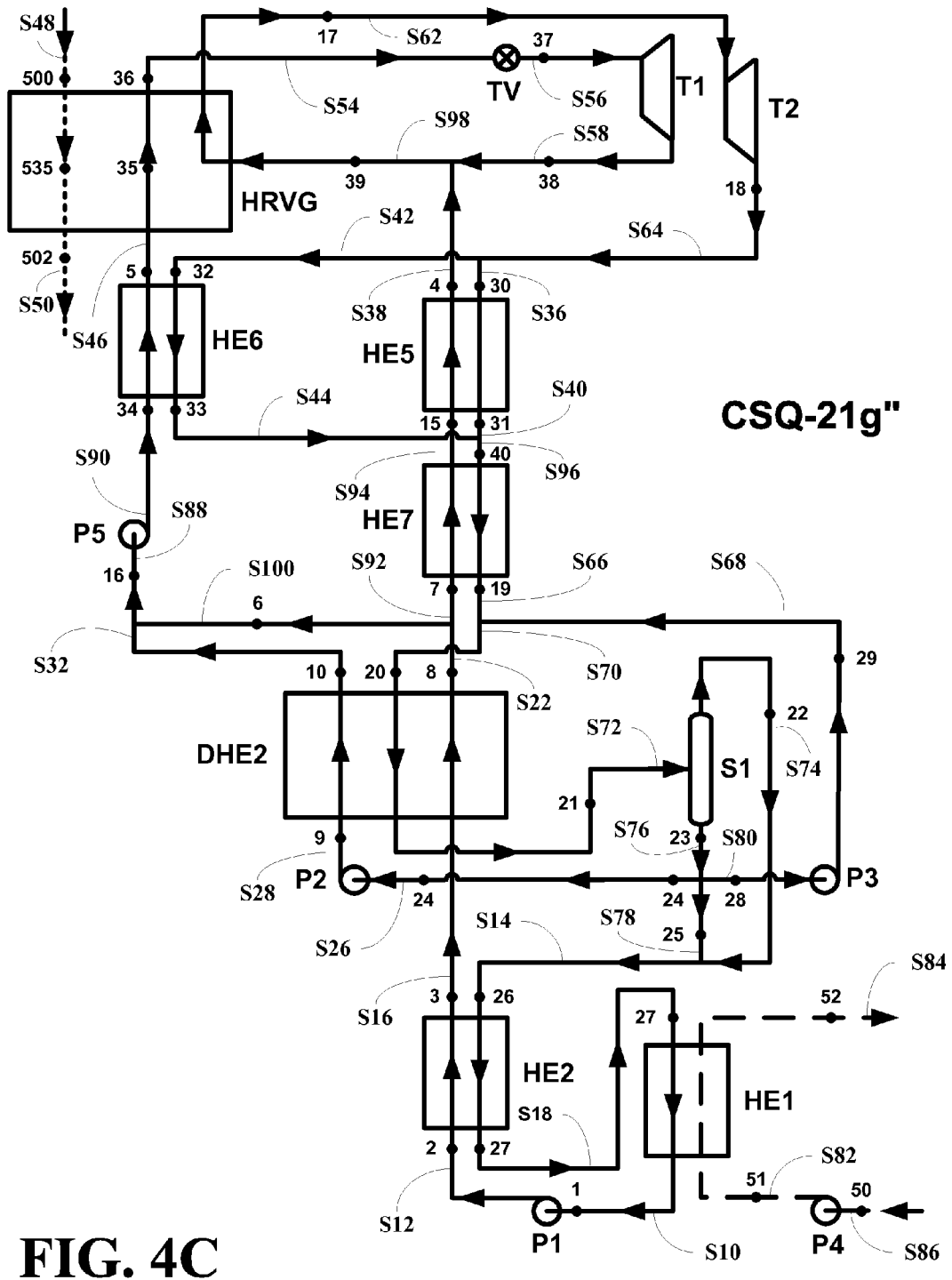
FIG. 4C depicts the embodiment of a system of FIG. 4A, where the heat exchangers HE3 and HE4 have been combined into a single, dual flow heat exchanger DHE2 designated CSQ-21g''.

In another alternate embodiment of the system of this invention shown in FIG. 4C, the leaner working fluid stream S28 having the parameters as at the point 9 and the richer working fluid stream 516 having the parameters as at the point 3 can be sent in parallel into a single, dual flow heat exchanger DHE2. In such a case, the lean condensing working fluid stream S70 having the parameters as at the point 20 is not divided, but is instead sent in counterflow to both the leaner working fluid stream S28 having the parameters as at the point 9 and the richer working fluid stream S16 having the parameters as at the point 3 in a dual flow heat exchanger DHE2 replacing the third and fourth heat exchange units HE3 and HE4, exiting as the partially condensed lean condensing working fluid stream S72 having the parameters as at the point 21.

Third Alternate of New Embodiments

Figure 4D:
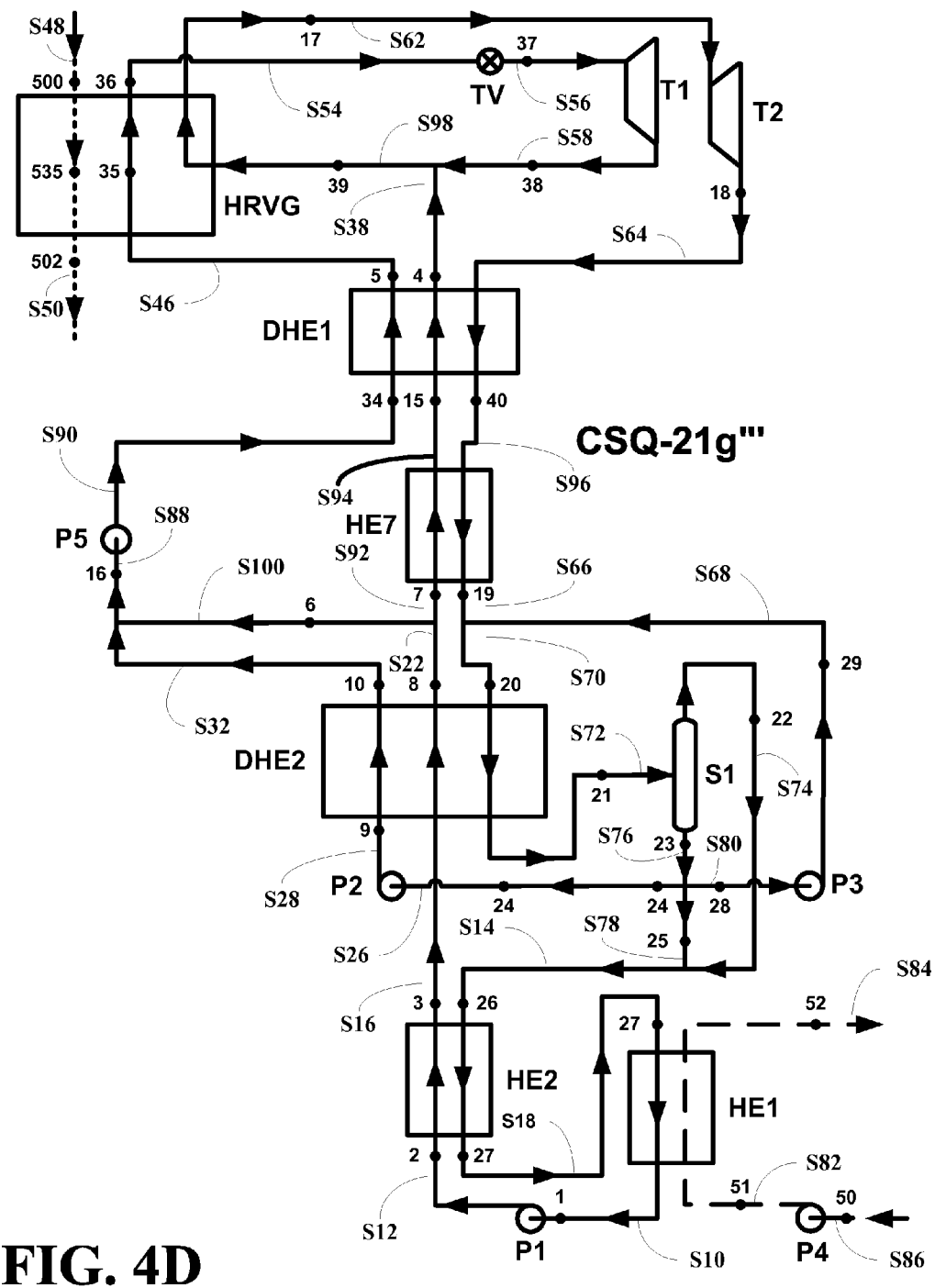
FIG. 4D depicts the embodiment of a system of FIG. 4A, where the heat exchangers HE5 and HE6 have been combined into a single, dual flow heat exchanger DHE1 and the heat exchangers HE3 and HE4 have been combined into a single, dual flow heat exchanger DHE2 designated CSQ-21g'''.

In yet another alternate embodiment of the system of this invention shown in FIG. 4D, the heat exchanger HE5 and HE6 are combined into a first single, dual flow heat exchanger DHE1 and the heat exchanger HE3 and HE4 are combined into a second single, dual flow heat exchanger DHE2 and the streams are a combination of the streams set forth in FIGS. 4B-C.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

I claim:

1. A method for heat conversion comprising the steps of:

converting a portion of heat in at least one fully vaporized, superheated rich working fluid stream into a useable form of energy in a turbine subsystem (TSS) to form a spent rich working fluid stream, heating a richer working fluid stream and a lean or leaner working fluid stream with heat from the spent rich working fluid stream in a vaporizing and superheating subsystem (VSS) including a heat recovery vapor generator (HRVG) and at least one VSS heat exchange unit, fully vaporizing and superheating the rich working fluid stream comprising the heated richer working fluid stream and the heated lean or leaner working fluid stream with from heat derived from an external heat source stream in the HRVG to form the fully vaporized, superheated rich working fluid stream, heating a higher pressure second leaner working fluid substream and a pre-heated, higher pressure richer working fluid stream with heat from a condensing working fluid stream in a heat exchange and separation subsystem (HESS) including at least one HESS heat exchange unit, a separator and at least two HESS pumps, separating a cooled condensing working fluid stream in the separator into a rich vapor stream and a liquid leaner working fluid stream, splitting the liquid leaner working fluid stream into first, second and third leaner working fluid substreams, pressurizing the first leaner working fluid substream to form a higher pressure first leaner working fluid stream, pressurizing the second leaner working fluid stream to form a higher pressure second leaner working fluid stream, combining a cooled spent rich working fluid stream and the higher pressure, second leaner working fluid substream to form the condensing working fluid, and pre-heating a higher pressure fully condensed richer working fluid stream with heat from the richer working fluid stream comprising the third leaner working fluid substream and the rich vapor stream to form a pre-heated richer working fluid stream and a partially condensed richer working fluid stream in a condensing subsystem (CSS) including two CSS heat exchange units and a CSS pump, condensing the partially condensed richer working fluid stream using an external coolant stream to form a fully condensed richer working fluid stream, and pressurizing the fully condensed richer working fluid stream to form the higher pressure fully condensed richer working fluid stream, where all of the streams are derived from a single multi-component fluid including at least one lower boiling point component and at least one higher boiling point component, where the rich vapor stream has a first fluid composition, where the richer working fluid streams having a second fluid composition, where the rich working fluid streams have a third fluid composition, where the condensing streams have a fourth fluid composition, where the leaner working fluid streams have a fifth fluid composition and where the lean working fluid streams have a sixth composition, where the first fluid composition has a higher concentration of the at least one lower boiling point component than the second fluid composition, which has a higher concentration of the at least one lower boiling point component than the third fluid composition and where the fifth composition has a higher concentration of the higher boiling point component than the fourth composition and where the third and fourth compositions are the same or the third composition has a higher concentration of the lower boiling point component than the fourth composition.

2. The method of claim 1, wherein the heated richer working fluid stream and the heated leaner working fluid stream are combined into a rich working fluid stream, prior to the rich working fluid stream entering the HRVG and exiting the HRVG as the at least one fully vaporized and superheated rich working fluid stream.

3. The method of claim 1, wherein the heated richer stream and the heated leaner stream are superheated in the HRVG and then combined into the at least one fully vaporized and superheated rich stream.

4. The method of claim 1, wherein the TSS comprises a higher pressure turbine having an admission valve and a lower pressure turbine, where the higher pressure turbine is adapted to convert a portion of heat in a fully vaporized, superheated leaner working fluid stream to form a spent leaner working fluid stream, where the lower pressure turbine is adapted to convert a portion of heat in a fully vaporized, superheated rich working fluid stream comprising a fully vaporized and superheated richer working fluid stream and the spent leaner working fluid stream and where the heated richer working fluid stream and the heated leaner working fluid stream are simultaneously vaporized and superheated in the HRVG and the spent leaner working fluid stream is simultaneously reheated in an upper part of the HRVG and where the VSS further includes two VSS heat exchange units, one of the VSS heat exchange units is adapted to heat the pre-heated first leaner working fluid substream and the other VSS heat exchange unit is adapted to heat and vaporize the heated richer working fluid stream with heat from two spent rich working fluid substream formed from the spent rich working fluid substream and where the HESS includes two HESS heat exchange units, one of the HESS heat exchange units is adapted to pre-heat the higher pressure, first leaner working fluid substream with heat from a first condensing working fluid substream and the other HESS heat exchange unit is adapted to heat the pre-heated richer working fluid stream and where the two cooled condensing working fluid substreams are combined into the cooled condensing working fluid stream.

5. The method of claim 1, wherein the TSS comprises a higher pressure turbine having an admission valve and a lower pressure turbine, where the higher pressure turbine is adapted to convert a portion of heat in a fully vaporized, superheated leaner working fluid stream to form a spent leaner working fluid stream, where the lower pressure turbine is adapted to convert a portion of heat in a fully vaporized, superheated rich working fluid stream comprising a fully vaporized and superheated richer working fluid stream and the spent leaner working fluid stream and where the heated richer working fluid stream and the heated leaner working fluid stream are simultaneously vaporized and superheated in the HRVG and the spent leaner working fluid stream is simultaneously reheated in an upper part of the HRVG and where the at least one VSS heat exchange unit comprises a dual flow heat exchange unit, where the pre-heated leaner working fluid substream and the heated richer working fluid stream are simultaneously heated by the spent rich working fluid stream and where the HESS includes two HESS heat exchange units, one of the HESS heat exchange units is adapted to pre-heat the higher pressure, first leaner working fluid substream with heat from a first condensing working fluid substream and the other HESS heat exchange unit is adapted to heat the pre-heated richer working fluid stream and where the two cooled condensing working fluid substreams are combined into the cooled condensing working fluid stream.

6. The method of claim 1, wherein the TSS comprises a higher pressure turbine having an admission valve and a lower pressure turbine, where the higher pressure turbine is adapted to convert a portion of heat in a fully vaporized, superheated leaner working fluid stream to form a spent leaner working fluid stream, where the lower pressure turbine is adapted to convert a portion of heat in a fully vaporized, superheated rich working fluid stream comprising a fully vaporized and superheated richer working fluid stream and the spent leaner working fluid stream and where the heated richer working fluid stream and the heated leaner working fluid stream are simultaneously vaporized and superheated in the HRVG and the spent leaner working fluid stream is simultaneously reheated in an upper part of the HRVG and where the VSS further includes two VSS heat exchange units, one of the VSS heat exchange units is adapted to heat the pre-heated first leaner working fluid substream and the other VSS heat exchange unit is adapted to heat and vaporize the heated richer working fluid stream with heat from two spent rich working fluid substream formed from the spent rich working fluid substream and where the at least one HESS heat exchange unit comprises a dual flow heat exchange unit, where the higher pressure, first leaner working fluid substream and the pre-heated richer working fluid stream are simultaneously heated by the condensing working fluid stream.

7. The method of claim 1, wherein the TSS comprises a higher pressure turbine having an admission valve and a lower pressure turbine, where the higher pressure turbine is adapted to convert a portion of heat in a fully vaporized, superheated leaner working fluid stream to form a spent leaner working fluid stream, where the lower pressure turbine is adapted to convert a portion of heat in a fully vaporized, superheated rich working fluid stream comprising a fully vaporized and superheated richer working fluid stream and the spent leaner working fluid stream and where the heated richer working fluid stream and the heated leaner working fluid stream are simultaneously vaporized and superheated in the HRVG and the spent leaner working fluid stream is simultaneously reheated in an upper part of the HRVG and where the at least one VSS heat exchange unit comprises a VSS dual flow heat exchange unit, where the pre-heated leaner working fluid substream and the heated richer working fluid stream are simultaneously heated by the spent rich working fluid stream and where the at least one HESS heat exchange unit comprises a HESS dual flow heat exchange unit, where the higher pressure, first leaner working fluid substream and the pre-heated richer working fluid stream are simultaneously heated by the condensing working fluid stream.

8. The method of claim 1,
wherein the TSS comprises a higher pressure turbine having an admission valve and a lower pressure turbine, where the higher pressure turbine is adapted to convert a portion of heat in a fully vaporized, superheated lean working fluid stream to form a spent lean working fluid stream, where the lower pressure turbine is adapted to convert a portion of heat in a fully vaporized, superheated rich working fluid stream;

wherein the VSS further includes three VSS heat exchange units, one of the VSS heat exchange units is adapted to heat the higher pressure, lean working fluid stream with heat from a first spent rich working fluid substream, another of the VSS heat exchange units is adapted to heat and vaporize a further heated, second richer working fluid substream with heat from a second spent rich working fluid substream, where the spent rich working fluid substreams are formed from the spent rich working fluid substream and where the third VSS heat exchange unit is adapted to further heat the heated, second richer working fluid substream with heat from a combined cooled spent rich working fluid stream and where a heated higher pressure, lean working fluid stream is fully vaporized and superheated in the HRVG and a fully vaporized rich working fluid stream is simultaneously superheated in an upper part of the HRVG, where the fully vaporized rich working fluid stream comprises a fully vaporized second richer working fluid substream and the spent lean working fluid stream to form the fully vaporized, superheated lean working fluid stream and the fully vaporized, superheated rich working fluid stream;

wherein the HESS includes two HESS heat exchange units and a third pump, where one of the HESS heat exchange units is adapted to pre-heat the higher pressure, first leaner working fluid substream with heat from a first condensing working fluid substream and the other HESS heat exchange unit is adapted to heat the pre-heated richer working fluid stream and where the two cooled condensing working fluid substreams are combined into the cooled condensing working fluid stream, and where the heated richer working fluid stream is split into a first heated richer working fluid substream and a second heated richer working fluid substream and where the pre-heated, first leaner working fluid substream is combined with the first heated richer working fluid substream to form a lean working fluid stream, and where the third pump is adapted to produce the higher pressure, lean working fluid stream.

9. The method of claim 1,
wherein the TSS comprises a higher pressure turbine having an admission valve and a lower pressure turbine, where the higher pressure turbine is adapted to convert a portion of heat in a fully vaporized, superheated lean working fluid stream to form a spent lean working fluid stream, where the lower pressure turbine is adapted to convert a portion of heat in a fully vaporized, superheated rich working fluid stream;

wherein the at least one VSS heat exchange unit comprises a dual flow heat exchange unit, where the higher pressure, lean working fluid stream and the further heated richer working fluid stream are simultaneously heated with heat from the spent rich working fluid stream and where a heated higher pressure, lean working fluid stream is fully vaporized and superheated in the HRVG and a fully vaporized rich working fluid stream is simultaneously superheated in an upper part of the HRVG, where the fully vaporized rich working fluid stream comprises a fully vaporized second richer working fluid substream and the spent lean working fluid stream to form the fully vaporized, superheated lean working fluid stream and the fully vaporized, superheated rich working fluid stream;

wherein the HESS includes two HESS heat exchange units and a third pump, where one of the HESS heat exchange units is adapted to pre-heat the higher pressure, first leaner working fluid substream with heat from a first condensing working fluid substream and the other HESS heat exchange unit is adapted to heat the pre-heated richer working fluid stream and where the two cooled condensing working fluid substreams are combined into the cooled condensing working fluid stream, and where the heated richer working fluid stream is split into a first heated richer working fluid substream and a second heated richer working fluid substream and where the pre-heated, first leaner working fluid substream is combined with the first heated richer working fluid substream to form a lean working fluid stream, and where the third pump is adapted to produce the higher pressure, lean working fluid stream.

10. The method of claim 1,
wherein the TSS comprises a higher pressure turbine having an admission valve and a lower pressure turbine, where the higher pressure turbine is adapted to convert a portion of heat in a fully vaporized, superheated lean working fluid stream to form a spent lean working fluid stream, where the lower pressure turbine is adapted to convert a portion of heat in a fully vaporized, superheated rich working fluid stream;
wherein the VSS further includes three VSS heat exchange units, one of the VSS heat exchange units is adapted to heat the higher pressure, lean working fluid stream with heat from a first spent rich working fluid substream, another of the VSS heat exchange units is adapted to heat and vaporize a further heated, second richer working fluid substream with heat from a second spent rich working fluid substream, where the spent rich working fluid substreams are formed from the spent rich working fluid substream and where the third VSS heat exchange unit is adapted to further heat the heated, second richer working fluid substream with heat from a combined cooled spent rich working fluid stream and where a heated higher pressure, lean working fluid stream is fully vaporized and superheated in the HRVG and a fully vaporized rich working fluid stream is simultaneously superheated in an upper part of the HRVG, where the fully vaporized rich working fluid stream comprises a fully vaporized second richer working fluid stream and the spent lean working fluid stream to form the fully vaporized, superheated lean working fluid stream and the fully vaporized, superheated rich working fluid stream;
wherein the HESS includes a third pump and the at least one HESS heat exchange unit comprises a dual flow heat exchange unit, where the higher pressure, first leaner working fluid substream and the pre-heated richer working fluid stream are simultaneously heated by the condensing working fluid stream and where the heated richer working fluid stream is split into a first heated richer working fluid substream and a second heated richer working fluid substream and where the pre-heated, first leaner working fluid substream is combined with the first heated richer working fluid substream to form a lean working fluid stream, and where the third pump is adapted to produce the higher pressure, lean working fluid stream.

11. The method of claim 1,
wherein the TSS comprises a higher pressure turbine having an admission valve and a lower pressure turbine, where the higher pressure turbine is adapted to convert a portion of heat in a fully vaporized, superheated lean working fluid stream to form a spent lean working fluid stream, where the lower pressure turbine is adapted to convert a portion of heat in a fully vaporized, superheated rich working fluid stream;
wherein the at least one VSS heat exchange unit comprises a dual flow heat exchange unit, where the higher pressure, lean working fluid stream and the further heated richer working fluid stream are simultaneously heated with heat from the spent rich working fluid stream and where a heated higher pressure, lean working fluid stream is fully vaporized and superheated in the HRVG and a fully vaporized rich working fluid stream is simultaneously superheated in an upper part of the HRVG, where the fully vaporized rich working fluid stream comprises a fully vaporized second richer working fluid substream and the spent lean working fluid stream to form the fully vaporized, superheated lean working fluid stream and the fully vaporized, superheated rich working fluid stream;
wherein the HESS includes a third pump and the at least one HESS heat exchange unit comprises a dual flow heat exchange unit, where the higher pressure, first leaner working fluid substream and the pre-heated richer working fluid stream are simultaneously heated by the condensing working fluid stream and where the heated richer working fluid stream is split into a first heated richer working fluid substream and a second heated richer working fluid substream and where the pre-heated, first leaner working fluid substream is combined with the first heated richer working fluid substream to form a lean working fluid stream, and where the third pump is adapted to produce the higher pressure, lean working fluid stream.

12. A method for heat conversion comprising the steps of:
converting a portion of heat in at least one fully vaporized, superheated rich working fluid stream into a useable form of energy in a turbine subsystem (TSS) to form a spent rich working fluid stream, where the TSS comprises a higher pressure turbine having an admission valve and a lower pressure turbine, where the higher pressure turbine is adapted to convert a portion of heat in a fully vaporized, superheated lean working fluid stream to form a spent lean working fluid stream, where the lower pressure turbine is adapted to convert a portion of heat in a fully vaporized, superheated rich working fluid stream,
heating a richer working fluid stream and a lean or leaner working fluid stream with heat from the spent rich working fluid stream in a vaporizing and superheating subsystem (VSS) including a heat recovery vapor generator (HRVG) and at least one VSS heat exchange unit, where the VSS further includes three VSS heat exchange units, one of the VSS heat exchange units is adapted to heat the higher pressure, lean working fluid stream with heat from a first spent rich working fluid substream, another of the VSS heat exchange units is adapted to heat and vaporize a further heated, second richer working fluid substream with heat from a second spent rich working fluid substream, where the spent rich working fluid substreams are formed from the spent rich working fluid substream and where the third VSS heat exchange unit is adapted to further heat the heated, second richer working fluid substream with heat from a combined cooled spent rich working fluid stream and where a heated higher pressure, lean working fluid stream is fully vaporized and superheated in the HRVG and a fully vaporized rich working fluid stream is simultaneously superheated in an upper part of the HRVG, where the fully vaporized rich working fluid stream comprises a fully vaporized second richer working fluid substream and the spent lean working fluid stream to form the fully vaporized, superheated lean working fluid stream and the fully vaporized, superheated rich working fluid stream, fully vaporizing and superheating the rich working fluid stream comprising the heated richer working fluid stream and the heated lean or leaner working fluid stream with from heat derived from an external heat source stream in the HRVG to form the fully vaporized, superheated rich working fluid stream, heating a higher pressure second leaner working fluid substream and a pre-heated, higher pressure richer working fluid stream with heat from a condensing working fluid stream in a heat exchange and separation subsystem (HESS) including at least one HESS heat exchange unit, a separator and at least two HESS pumps, where the HESS includes two HESS heat exchange units and a third pump, where one of the HESS heat exchange units is adapted to pre-heat the higher pressure, first leaner working fluid substream with heat from a first condensing working fluid substream and the other HESS heat exchange unit is adapted to heat the pre-heated richer working fluid stream and where the two cooled condensing working fluid substreams are combined into the cooled condensing working fluid stream, and where the heated richer working fluid stream is split into a first heated richer working fluid substream and a second heated richer working fluid substream and where the pre-heated, first leaner working fluid substream is combined with the first heated richer working fluid substream to form a lean working fluid stream, and where the third pump is adapted to produce the higher pressure, lean working fluid stream, separating a cooled condensing working fluid stream in the separator into a rich vapor stream and a liquid leaner working fluid stream, splitting the liquid leaner working fluid stream into first, second and third leaner working fluid substreams, pressurizing the first leaner working fluid substream to form a higher pressure first leaner working fluid stream, pressurizing the second leaner working fluid stream to form a higher pressure second leaner working fluid stream, combining a cooled spent rich working fluid stream and the higher pressure, second leaner working fluid substream to form the condensing working fluid, and pre-heating a higher pressure fully condensed richer working fluid stream with heat from the richer working fluid stream comprising the third leaner working fluid substream and the rich vapor stream to form a pre-heated richer working fluid stream and a partially condensed richer working fluid stream in a condensing subsystem (CSS) including two CSS heat exchange units and a CSS pump, condensing the partially condensed richer working fluid stream using an external coolant stream to form a fully condensed richer working fluid stream, and pressurizing the fully condensed richer working fluid stream to form the higher pressure fully condensed richer working fluid stream, where all of the streams are derived from a single multi-component fluid including at least one lower boiling point component and at least one higher boiling point component, where the rich vapor stream has a first fluid composition, where the richer working fluid stream having a second fluid composition, where the rich working fluid streams have a third fluid composition, where the condensing streams have a fourth fluid composition, where the leaner working fluid streams have a fifth fluid composition and where the lean working fluid streams have a sixth composition.

13. The method of claim 12, wherein the first fluid composition has a higher concentration of the at least one lower boiling point component than the second fluid composition, which has a higher concentration of the at least one lower boiling point component than the third fluid composition and where the fifth composition has a higher concentration of the higher boiling point component than the fourth composition and where the third and fourth compositions are the same or the third composition has a higher concentration of the lower boiling point component than the fourth composition.

14. A method for heat conversion comprising the steps of:
converting a portion of heat in at least one fully vaporized, superheated rich working fluid stream into a useable form of energy in a turbine subsystem (TSS) to form a spent rich working fluid stream, where the TSS comprises a higher pressure turbine having an admission valve and a lower pressure turbine, where the higher pressure turbine is adapted to convert a portion of heat in a fully vaporized, superheated lean working fluid stream to form a spent lean working fluid stream, where the lower pressure turbine is adapted to convert a portion of heat in a fully vaporized, superheated rich working fluid stream, heating a richer working fluid stream and a lean or leaner working fluid stream with heat from the spent rich working fluid stream in a vaporizing and superheating subsystem (VSS) including a heat recovery vapor generator (HRVG) and at least one VSS heat exchange unit, where the VSS further includes three VSS heat exchange units, one of the VSS heat exchange units is adapted to heat the higher pressure, lean working fluid stream with heat from a first spent rich working fluid substream, another of the VSS heat exchange units is adapted to heat and vaporize a further heated, second richer working fluid substream with heat from a second spent rich working fluid substream, where the spent rich working fluid substreams are formed from the spent rich working fluid substream and where the third VSS heat exchange unit is adapted to further heat the heated, second richer working fluid substream with heat from a combined cooled spent rich working fluid stream and where a heated higher pressure, lean working fluid stream is fully vaporized and superheated in the HRVG and a fully vaporized rich working fluid stream is simultaneously superheated in an upper part of the HRVG, where the fully vaporized rich working fluid stream comprises a fully vaporized second richer working fluid stream and the spent lean working fluid stream to form the fully vaporized, superheated lean working fluid stream and the fully vaporized, superheated rich working fluid stream, fully vaporizing and superheating the rich working fluid stream comprising the heated richer working fluid stream and the heated lean or leaner working fluid stream with from heat derived from an external heat source stream in the HRVG to form the fully vaporized, superheated rich working fluid stream, heating a higher pressure second leaner working fluid substream and a pre-heated, higher pressure richer working fluid stream with heat from a condensing working fluid stream in a heat exchange and separation subsystem (HESS) including at least one HESS heat exchange unit, a separator and at least two HESS pumps, where the HESS includes a third pump and the at least one HESS heat exchange unit comprises a dual flow heat exchange unit, where the higher pressure, first leaner working fluid substream and the pre-heated richer working fluid stream are simultaneously heated by the condensing working fluid stream and where the heated richer working fluid stream is split into a first heated richer working fluid substream and a second heated richer working fluid substream and where the pre-heated, first leaner working fluid substream is combined with the first heated richer working fluid substream to form a lean working fluid stream, and where the third pump is adapted to produce the higher pressure, lean working fluid stream, separating a cooled condensing working fluid stream in the separator into a rich vapor stream and a liquid leaner working fluid stream, splitting the liquid leaner working fluid stream into first, second and third leaner working fluid substreams, pressurizing the first leaner working fluid substream to form a higher pressure first leaner working fluid stream, pressurizing the second leaner working fluid stream to form a higher pressure second leaner working fluid stream, combining a cooled spent rich working fluid stream and the higher pressure, second leaner working fluid substream to form the condensing working fluid, and pre-heating a higher pressure fully condensed richer working fluid stream with heat from the richer working fluid stream comprising the third leaner working fluid substream and the rich vapor stream to form a pre-heated richer working fluid stream and a partially condensed richer working fluid stream in a condensing subsystem (CSS) including two CSS heat exchange units and a CSS pump, condensing the partially condensed richer working fluid stream using an external coolant stream to form a fully condensed richer working fluid stream, and pressurizing the fully condensed richer working fluid stream to form the higher pressure fully condensed richer working fluid stream, where all of the streams are derived from a single multi-component fluid including at least one lower boiling point component and at least one higher boiling point component, where the rich vapor stream has a first fluid composition, where the richer working fluid streams having a second fluid composition, where the rich working fluid streams have a third fluid composition, where the condensing streams have a fourth fluid composition, where the leaner working fluid streams have a fifth fluid composition and where the lean working fluid streams have a sixth composition.

15. The method of claim 14, wherein the first fluid composition has a higher concentration of the at least one lower boiling point component than the second fluid composition, which has a higher concentration of the at least one lower boiling point component than the third fluid composition and where the fifth composition has a higher concentration of the higher boiling point component than the fourth composition and where the third and fourth compositions are the same or the third composition has a higher concentration of the lower boiling point component than the fourth composition.

* * * * *